US 12,216,771 B2
United States Patent
Murdoch et al.

(10) Patent No.: US 12,216,771 B2
(45) Date of Patent: Feb. 4, 2025

(54) ENCRYPTED VERIFIABLE CREDENTIALS

(71) Applicant: Microsoft Technology Licensing, LLC, Redmond, WA (US)

(72) Inventors: Brandon Murdoch, Reading (GB); Ankur Patel, Sammamish, WA (US); Guillermo P. Proano, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 272 days.

(21) Appl. No.: 17/997,511

(22) PCT Filed: Apr. 23, 2021

(86) PCT No.: PCT/US2021/028888
§ 371 (c)(1),
(2) Date: Oct. 28, 2022

(87) PCT Pub. No.: WO2021/222027
PCT Pub. Date: Nov. 4, 2021

(65) Prior Publication Data
US 2023/0177174 A1  Jun. 8, 2023

(30) Foreign Application Priority Data
Apr. 28, 2020  (LU) .................................. LU101757

(51) Int. Cl.
*G06F 21/60* (2013.01)
*G06F 21/34* (2013.01)
*G06F 21/62* (2013.01)

(52) U.S. Cl.
CPC ............ *G06F 21/602* (2013.01); *G06F 21/34* (2013.01); *G06F 21/6209* (2013.01)

(58) Field of Classification Search
CPC ..... G06F 21/602; G06F 21/34; G06F 21/6209
See application file for complete search history.

(56) References Cited

U.S. PATENT DOCUMENTS

| 2009/0187427 A1* | 7/2009 | Durand | .................. | G06Q 10/10 |
| | | | | 705/2 |
| 2010/0133340 A1* | 6/2010 | Huntley | .................. | G07F 17/32 |
| | | | | 235/386 |

(Continued)

FOREIGN PATENT DOCUMENTS

LU  101620 B1  7/2021

OTHER PUBLICATIONS

"Search Report Issued in Luxembourg Application No. LU101757", Mailed Date: Dec. 28, 2020, 9 Pages.

(Continued)

*Primary Examiner* — Vance M Little
(74) *Attorney, Agent, or Firm* — Workman Nydegger

(57) ABSTRACT

Encrypting a verifiable credential (VC) and generating one or more instructions, at least one of which grants a scope of permission associated with the VC to the relying entity. The scope of permission includes permission to access a subset of data contained in the VC or a portion of data that can be derived from data contained in the VC. The encrypted VC and the one or more instructions are sent to the credential issuer or the relying entity to cause the credential issuer to generate a response containing the subset of data or the derived data and a proof code. The proof code is configured to prove the validity of the subset of data or the derived data.

20 Claims, 14 Drawing Sheets

(56) References Cited

U.S. PATENT DOCUMENTS

| | | | |
|---|---|---|---|
| 2012/0011587 A1* | 1/2012 | Byrne | G06F 21/6218 |
| | | | 726/21 |
| 2012/0110680 A1* | 5/2012 | Oliver | H04L 63/102 |
| | | | 726/30 |
| 2015/0341340 A1 | 11/2015 | Lu et al. | |
| 2016/0380774 A1* | 12/2016 | Lovelock | H04L 9/3247 |
| | | | 713/169 |
| 2017/0006066 A1* | 1/2017 | Eckel | H04L 63/20 |
| 2017/0039388 A1* | 2/2017 | Vas | H04L 63/107 |
| 2017/0149563 A1 | 5/2017 | Camenisch et al. | |
| 2020/0021588 A1* | 1/2020 | Wittrock | G07C 9/22 |
| 2020/0244470 A1* | 7/2020 | Ruckriemen | G06F 21/645 |

OTHER PUBLICATIONS

"International Search Report and Written Opinion Issued in PCT Application No. PCT/US21/028888", Mailed Date : Jul. 23, 2021, 12 Pages.

Sporny, "Verifiable Credentials Data Model 1.0", Retrieved from: https://www.w3.org/TR/2019/CR-verifiable-claims-data-model-20190328/#sharing-information-with-the-wrong-party, Mar. 28, 2019, 95 Pages.

"Notice of Allowance Issued in European Patent Application No. 21723938.3", Mailed Date: Mar. 3, 2023, 8 Pages.

"Decision to grant Issued in European Patent Application No. 21723938.3", Mailed Date: Jun. 2, 2023, 2 Pages.

\* cited by examiner

ENCRYPTED VERIFIABLE CREDENTIALS

CROSS-REFERENCE TO RELATED APPLICATIONS

The present application is a U.S. National Stage of International Application No. PCT/US2021/028888, filed on Apr. 23, 2021, designating the United States, and claiming the priority of Luxembourg Patent Application No. LU101757 filed with the Luxembourg Intellectual Property Office on Apr. 28, 2020. All of the aforementioned applications are incorporated herein in their respective entireties by this reference.

BACKGROUND

A digital identity is a mechanism to keep track of an entity across different digital contexts. After an identity is determined, appropriate action can be taken related to the entity that has the identity. As an example, authorizations, privileges, customizations and access can be provided to the entity. Thus, digital identities are an important mechanism to ensure that information is restricted to appropriate trust boundaries via appropriate containment of authorizations and privileges. Digital identities are also an important mechanism to ensure a positive and consistent user experience when accessing their data and customizations.

Most currently used documents or records that prove identity are issued by centralized organizations, such as governments, corporations, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. When a party needs to verify another party's identity, the verifying party often needs to go through the centralized identity management system to obtain information verifying and/or authenticating the other party's identity.

Decentralized Identifiers (DIDs) are a more recent type of identifier. Decentralized identifiers are independent of any centralized registry, identity provider, or certificate authority. Distributed ledger technology (such as blockchain) provides the opportunity for using fully decentralized identifiers. Distributed ledger technology uses distributed ledgers to record transactions between two or more parties in a verifiable way. Once a transaction is recorded, the data in the section of ledger cannot be altered retroactively without the alteration of all subsequent sections of ledger. This provides a fairly secure platform in which it is difficult or impossible to tamper with data recorded in the distributed ledger. Since a DID is generally not controlled by a centralized management system, but rather is owned by an owner of the DID, DIDs are sometimes referred to as identities without authority.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Existing computing technologies provide for a data structure called a "verifiable credential" (hereinafter also called a "VC"). In these technologies, a credential issuer makes one or more claims about a subject entity, and generates a VC. The VC includes those claim(s) as well as a proof (e.g., cryptographic signature or code) to prove that claim(s) have not been tampered with and were indeed issued by the credential issuer. Thus, the proof is also called proof code. The credential issuer then provides the VC to a credential holder, for presentation to any relying party that relies upon the veracity of those claims. When the subject entity is a person, the subject entity and the credential holder are often the same entity. When the subject entity is not a person (e.g., a device, a pet), the credential holder may be the owner of the subject entity.

As an example, the claims issuer might be a computing system associated with a government agency in charge of issuing driver licenses. The government agency may generate a VC with claims about a citizen, such as the date of birth, residence address, weight, eye color, hair color, authorization to drive, restrictions on authorization to drive, and so forth. The government agency issues the VC to the citizen, just like issuing a physical driver license. The user stores the VC in a computing system (e.g., a mobile phone) or in a cloud storage that the user's computing system has access to.

If the user is to rent a car from a car rental company, the user may present the VC, whereby a computing system associated with the rental car company may use the proof code to verify that the claims include authorization to drive, and were issued by the government agency and indeed have not been tampered with since issuance. In another example, when the user tries to purchase liquor, the user may also present the same VC, whereby a computing system associated with the liquor store may use the proof code to verify that the claims include information whether the user has reached the age of majority.

However, the existing VCs present several problems. First, when a user presents such a VC, all the claims contained in the VC are presented to the relying entity, just like when a user presents a driver's license to the relying entity. In many cases, the user may only want to show, and the relying entity may only need to know, a particular claim in the VC or some information that can be derived from the VC. For example, the rental car company only needs to know whether the user is authorized to drive, and the liquor store only needs to know whether the user has reached the age of majority.

Second, the existing VCs (similar to physical driver licenses) also present a validity problem. For example, the issued VC may be revoked under certain circumstances. Merely allowing a user to present an issued VC generally cannot prove that the VC is still valid or has not been revoked. It is similar to that when a driver's driver license is revoked, the driver may still possess the physical driver license card, and may still present the physical driver license card to a rental car company. If the rental car company does not conduct further research into the government database, the rental car company probably would not know that the driver (holding the driver license card) is no longer authorized to drive.

The embodiments described herein solve the above-described problems by allowing the credential holder to request a subset of data that is contained in the VC or data that can be derived from data contained in the VC. First, the computing system associated with the credential issuer encrypts a VC by a public key of the credential issuer. Since the VC is encrypted by the public key of the credential issuer, the credential issuer is the only entity that is capable of accessing the content of the encrypted VC via its private key. The credential issuer's public key may be obtained from the metadata of the credential or be obtained through other channels (e.g., retrieved from a distributed ledger, or received from the credential issuer or a certificate authority).

The computing system of the credential holder also generates one or more instructions. At least one of the instructions instructs the credential issuer to grant a scope of permission associated with the encrypted VC to a relying entity. The scope of permission includes at least permission to access a subset of data that can be extracted from the VC or a portion of data that can be derived from the VC. The encrypted VC and the instructions are then sent to the relying entity and/or the credential issuer. In either case, the credential issuer is required to decrypt the encrypted VC, and to make available a particular portion of data contained in the VC and/or data that can be derived from the VC based on the instruction. In some embodiments, the at least one instructions that grant the scope of permission to the relying entity are wrapped in a second VC. The second VC is issued on behalf of the subject entity to the relying entity. The second VC includes at least one claim that grants the relying entity the scope of permission associated with the encrypted VC.

In some embodiments, the one or more instructions also includes at least one of the following: (1) a data encryption scheme that is used to encrypt the VC: (2) an address or an identifier of an entity that is to receive the response. The entity that is to receive the response includes at least one of the (1) the credential holder, (2) the subject entity, or (3) the relying entity. Some of the instructions are attached to the encrypted first VC and/or the second VC as metadata. Alternatively, or in addition, some of the instructions are attached to a request sent to the relying entity or the credential issuer with the encrypted first VC and the second VC.

In some cases, the one or more instructions are generated based on user inputs. Alternatively, or in addition, the one or more instructions are generated based on a request from the relying entity. For example, the computing system receives a request from the relying entity for verifying certain information associated with the VC. In response to receiving the request, the computing system may notify the user about the request, and the user may approve or deny the request via a user input. In response to the user's request, the computing system may then generate the one or more instructions.

In some embodiments, in a decentralized environment, the status of the VC is propagated onto a distributed ledger. As such, the validation of the claim can be performed by the credential issuer via accessing data propagated onto the distributed ledger. For example, when the status of the VC changes (e.g., the VC is revoked), the changed status (e.g., the revocation) is propagated onto the distributed ledger, such that the credential issuer can retrieve information related to the status of the VC from the distributed ledger. In such a decentralized environment, each VC may be associated with one or more decentralized identifiers (DIDs). For example, at least one of the subject entity, the credential holder, the relying entity, or the credential issuer is an owner of a DID. The VC is thus associated with the DID(s), and certain data or transformed data related to the VC is propagated onto the corresponding distributed ledger.

Further, another problem of the traditional VCs is that they are not easily understood by the general users or public because such VCs are often recorded in a code format, such as the JSON Web Token (JWT) format. The embodiments described herein solve this problem by transforming the code of a traditional verifiable claim into a personal identity card. The personal identity card is a data structure that not only includes the data contained in the VC, but also includes additional metadata (e.g., a logo of the claim issuer, usage data, presentation format, etc.). The personal identity card is then presented to a user as one or more visualizations that resemble a physical identity card. The visualizations also allow users to easily interact with the credential issuer and/or the relying entity. For example, a visualization of the personal identity card may allow the user to request the credential issuer to extract and/or derive information from the claims contained in the VC.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein are related to requesting a credential issuer for a subset of verifiable data that is contained in a verifiable credential (VC) and/or data that can be derived from data contained in the VC. The embodiments are likely implemented in a computing system that is associated with a credential holder. The computing system (associated with a credential holder) receives a VC from a credential issuer. A VC is a data structure that contains one or more claims about a subject entity and often issued by a same claim issuer. In some embodiments, a claim is expressed using a property-value pair. FIG. 1A illustrates an example data structure that represents a claim 100A. The claim 100A includes a subject 111A, a property 112A, and a value 113A. For example, the subject 111A includes an identifier of the subject entity (e.g., a decentralized identifier (DID)). The property 112A may be any property of the subject of the DID, such as a name, an address, a date of birth, etc. The value 113A is the value of the corresponding property 112A. For example, when the property 112A is a "name", the value 113A would be the name of the subject entity 111A, e.g., John Doe. When the property is an "address", the value 113A would be the address of the subject entity 111A, e.g., 123 Main St., City, State, Zipcode.

A claim issuer (hereinafter also referred to as a credential issuer) is often capable of issuing multiple claims for each subject entity. For example, a division of motor vehicles (DMV) can issue many claims about a citizen, such as the date of birth, residence address, weight, eye color, hair color, authorization to drive, restrictions on authorization to drive, and so forth. One or more claims issued by the same claim issuer can be bundled and issued to the citizen as a VC, just like issuing a physical driver license card. The physical driver license card includes various information about the driver, not just an authorization to drive or restrictions on authorization to drive.

Figure 1B:
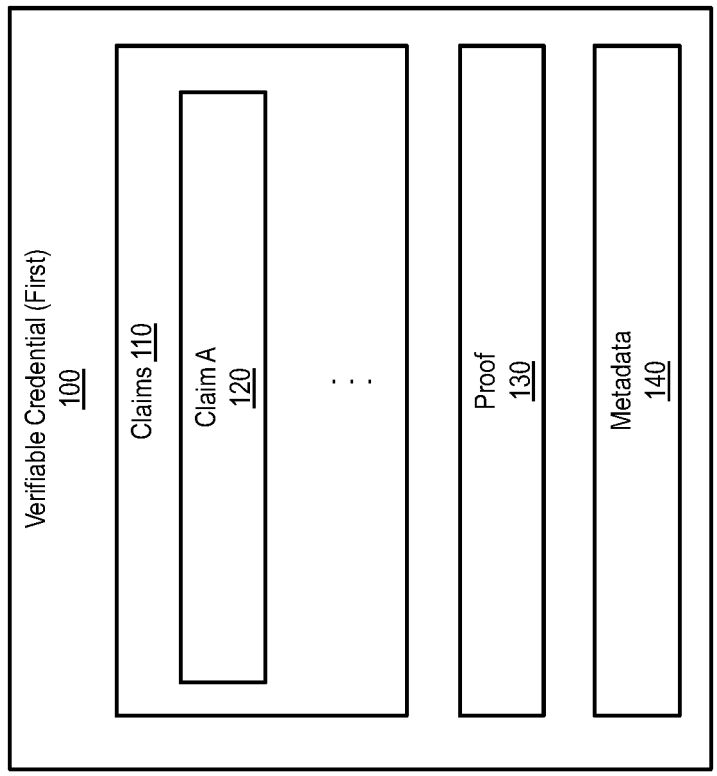
FIG. 1B illustrates an example data structure of a first verifiable credential (VC)
Figure 1A:
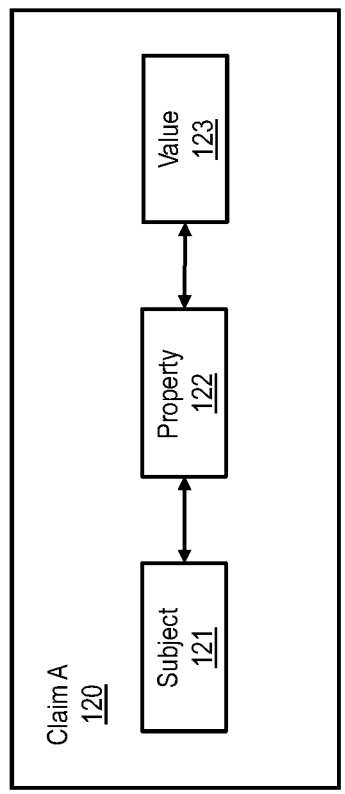
FIG. 1A illustrates an example data structure of a claim.

FIG. 1B illustrates an example VC 100B. The VC 100B includes one or more claims 110B (e.g., claims 111B, 112B), and proof code 120B. The proof code 120B often includes a cryptographic signature that is signed by a private key of the claim issuer. When a relying entity receives the VC 100B, the relying entity can retrieve a public key of the claim issuer and decrypt the cryptographic signature, and compare the decrypted signature with the data contained in the claims 110B to verify at least that (1) the VC was indeed issued by the claim issuer, (2) the claims contained in the VC have not been tempered. In some embodiments, the VC also includes various metadata 130B, which is data related to the VC 100B. For example, the metadata 130B may include (1) a unique identifier identifying the corresponding VC 100B. (2) one or more conditions for accessing the VC 100B, or (3) one or more revocation mechanisms for revoking the corresponding VC 100B.

When a VC holder interacts with a relying entity, the VC holder can present or send the VC to the relying entity via various channels, including but are not limited to wide area network (WAN), local area network (LAN), Bluetooth (BLE), near field communication (NFC), 2G/3G/4G/5G mobile communication networks, SMS, a scan of a bar code or QR code. When the relying entity receives the VC 100B, the relying entity can use the proof code 120B to authenticate the claims 110B contained in the VC.

However, when the VC is sent to a relying entity, all the claims 110B contained in the VC are made available to the relying entity. For example, if the VC is a driver's license, and the relying entity is a liquor store, the liquor store not only can see the exact date of birth of the subject entity, but also can see the legal name, driver license number, and the home address of the subject entity. As such, the privacy of the subject entity can be put at risk.

The principles described in solve the above-mentioned problem by allowing the credential holder to request a subset of data contained in the VC and/or data that can be derived from the VC, and granting a relying entity access to only the subset of data and/or the derived data. To achieve this goal, a computing system associated with the credential holder is configured to obtain a public key of the credential issuer and encrypt the verifiable credential 100B by the public key. In some embodiments, the public key of the claim issuer is included in the verifiable credential 100B. In some embodiments, a public key is recorded with and can be retrieved from an authentication service. In yet some other embodiments, in a decentralized environment, the public key may be propagated onto and be retrieved from a distributed ledger.

Figure 1C:
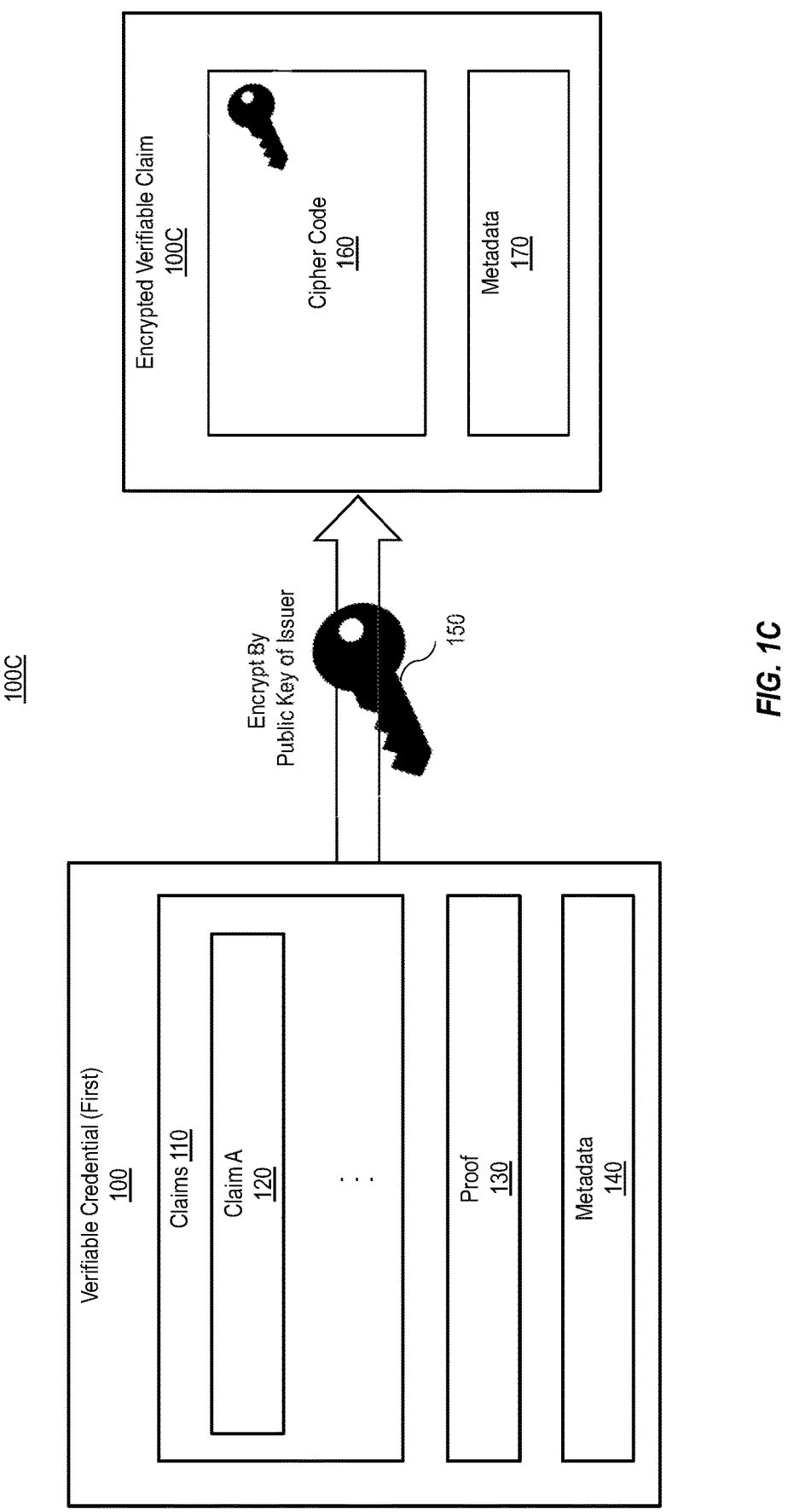
FIG. 1C illustrates an example embodiment of encrypting a first VC using a public key of the credential issuer.

FIG. 1C illustrates an example embodiment 100C of encrypting a verifiable credential 100B. In some implementations, the whole VC 100B is encrypted by a public key 120C of the claim issuer. The encrypted VC will become cipher code 111C. Additional metadata 112C is attached to the cipher code 111C to form the data structure of the encrypted VC 110C. In some implementations, only a portion of the VC 100B is encrypted by the public key 120C of the claim issuer. For example, the encrypted portion of the VC 100B may be the one or more claims 110B, and the proof code 120B and/or the metadata 130B are not encrypted. The not encrypted data (e.g., the proof code 120B and/or metadata 130B) may be appended to the cipher code 111C as part of the metadata 112C. The term "encrypt" or "encrypting" a VC used in the present application refers to encrypting the whole VC or encrypting a portion of the VC.

After the VC 100B is encrypted, the computing system then generates one or more instructions. At least one of the instructions grants a scope of permission associated with the encrypted VC to the relying entity. The scope of permission includes at least permission to access a subset of data that can be extracted from the VC or a portion of data that can be derived from the VC. For example, when a user is to rent a car, the user may instruct the credential issuer (e.g., DMV) to disclose to the rental car company only the claim(s) related to authorization to drive and/or restrictions on authorization to drive. In some cases, one of the instruction(s) may instruct the credential issuer to derive particular information from one or more of the claims contained the VC. For example, when a user is to purchase liquor, the user may instruct the credential issuer (e.g. DMV) to disclose to the liquor store only that the subject entity has reached the majority of age, which can be derived from the claim related to the date of birth of the subject entity.

In some cases, one of the instruction(s) may instruct the credential issuer to validate at least one of the claim(s) contained in the VC. In a decentralized environment, a portion of data related to the VC may be propagated onto a distributed ledger. In such a case, the credential issuer validates the claim(s) via accessing data propagated onto the distributed ledger. For example, when the status of any claim changes (e.g., the claim is revoked), the changed status (e.g., the revocation) is propagated onto the distributed ledger, such that the credential issuer can retrieve information related to the status of the claim from the distributed ledger. In such a decentralized environment, each claim and/or VC may be associated with one or more decentralized identifiers (DIDs). For example, at least one of the subject entity, the credential holder, the relying entity, or the credential issuer is an owner of a DID. The VC is thus associated with the DID(s), and certain data or transformed data related to the VC is propagated onto the corresponding distributed ledger.

In some cases, the one or more instructions may also include (1) a data encryption scheme that is used to encrypt the VC: or (2) an address and/or an identifier of an entity that is to receive the response. The entity that is to receive the response may be the credential holder, the subject entity, and/or the relying entity. In some cases, at least one of the subject entity, the credential holder, the relying entity, or the credential issuer is an owner of a decentralized identifier. In such a case, the one or more instructions includes the DID(s), and a portion of data related to the VC or the DID is propagated onto a distributed ledger. The encrypted VC and the one or more instructions are then sent to the relying entity and/or the credential issuer as a request. Some of the one or more instructions may be attached to the encrypted VC as metadata. Alternatively, or in addition, some of the one or more instructions may be included in the request that is sent to the relying entity or the credential issuer.

In some embodiments, the at least one instructions that grant the scope of permission to the relying entity are wrapped in a second VC. The second VC is issued on behalf of the subject entity to the relying entity. The second VC includes at least one claim that grants the relying entity the scope of permission associated with the encrypted VC. For clarity, hereinafter the VC 100, which is about the subject entity and is encrypted, is called a first VC. Note, the first VC 100 and the second VC have two sets of credential issuer, subject entity, and relying entity. However, since the primary purpose of the transaction is to allow the relying entity of the first VC to have access to a scope of permission associated with the first VC, the terms "subject entity", "relying entity" and "credential issuer" by themselves are referred to the subject entity, relying entity, and credential issuer of the first VC.

Figure 1E:
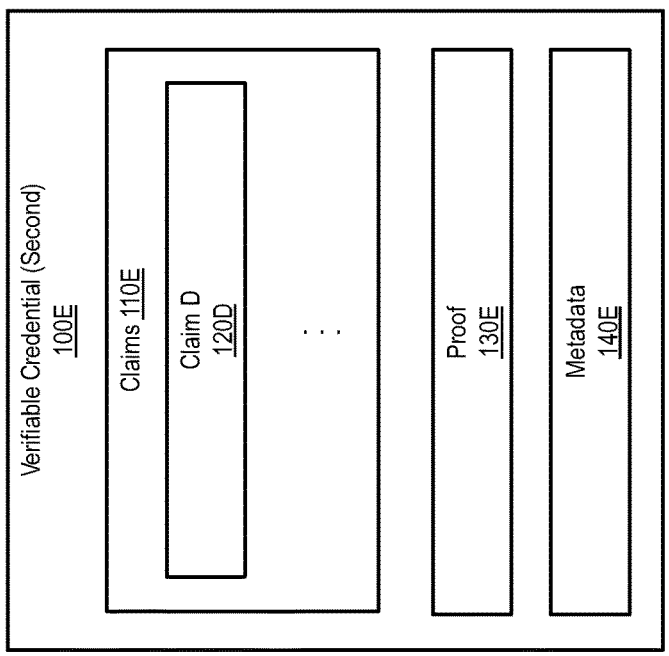
FIG. 1E illustrates an example second VC that includes the claim that grants a relying entity a scope of permission associated with the first VC.
Figure 1D:
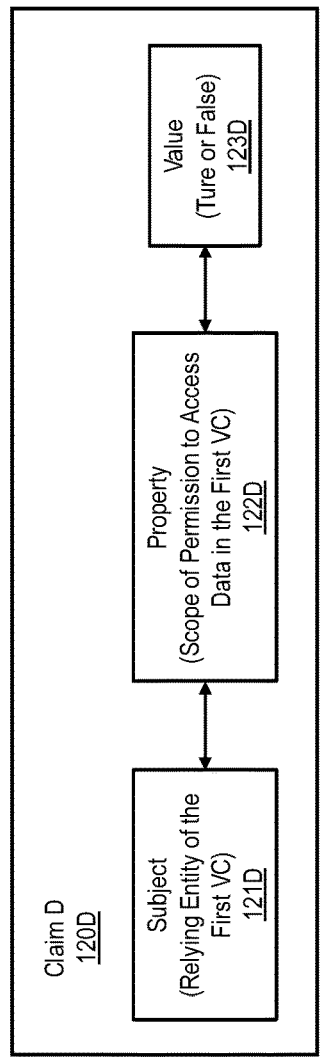
FIG. 1D illustrates an example claim that grants a relying entity a scope of permission associated with the first VC.

FIG. 1D illustrates an example claim 120D that grants the relying entity a scope of permission associated with the first VC 100. FIG. 1E illustrates an example second VC 100E that contains the claim 120D. As illustrated in FIG. 1D, the subject entity of claim D 120D is the relying entity of the first VC 100. The property 122D of claim D 120D is a scope of permission to access a subset of data contained in the first VC 100. The value 123D of the property may be true or false. For example, the scope of permission 122D may be the date of birth of the subject entity of the first VC 100, and the value 123D may be true. Thus, the second VC 120D grants the relying entity to access the date of birth of the subject entity of the first VC 100. The claim 120D is issued by the subject entity of the first VC 100. As discussed above, the first VC 100 is issued by a credential issuer (e.g., DMV), the first VC 100's subject entity 121 may be a user or a consumer (e.g., a driver), and a relying entity of the first VC 100 may be a business establishment (e.g., a liquor store). At the same time, the subject entity of the first VC 100 is also capable of issuing claims and VCs. As an example, the second claim 120D is issued by the subject entity 121 (e.g., a user or a consumer) of the first VC 100. The subject entity 121D of the second claim 120D is the relying entity (e.g., a business establishment) of VC 100. The relying entity of the second claim 120D is the claim issuer (e.g., DMV) of the first VC 100.

A proof 130E is then generated and attached to the claim D 120D to turn the claim D 120D into a second VC 100E. The proof may be proof code, such as a signature signed by a private key of the issuer (i.e., the subject entity 121 of the first VC) that proves that the VC 100E was issued by the issuer (i.e., the subject entity 121 of the first VC). Additional metadata 140E may also be generated and attached to the second VC 100E. In some embodiments, some of the one or more other instructions may be attached to the second VC as part of the metadata. The encrypted first VC 100C and the second VC 100E are then sent to the relying entity of the first VC 100 and or the credential issuer of the first VC 100.

When the credential issuer receives the request, the credential issuer decrypts the VC using its private key, and generates a response based on the one or more instructions (e.g., the granted scope of permission contained in the second VC). In some cases, the response includes information derived from the original first VC. For example, when the instruction instructs the credential issuer to only disclose whether the subject entity has reached the age of majority, the credential issuer accesses the value contained in the claim related to the date of birth of the subject entity, and determines whether the subject entity has reached the age of majority. In response to a determination that the subject entity has reached the age of majority, the credential issuer generates verifiable data including the determination and proof code. The proof code likely includes a cryptographic signature that is signed by a private key of the credential issuer. The verifiable data is then included in the response, which is sent to the relying entity, the subject entity, and/or the credential holder. In some cases, the response includes a new VC that includes a subset of the claims contained in the original VC and/or one or more new claims that are derived from the claims in the original VC. Since the verifiable data is newly generated, the time stamp of the verifiable data can be used to prove the validity of the data.

In some implementations, the response is sent to the relying entity directly. In some implementations, the response is sent to the credential holder, and the credential holder then forwards at least the verifiable data (i.e., the subset of data/the derived portion of data and the proof code) that is contained in the response to the relying entity.

Figure 2B:
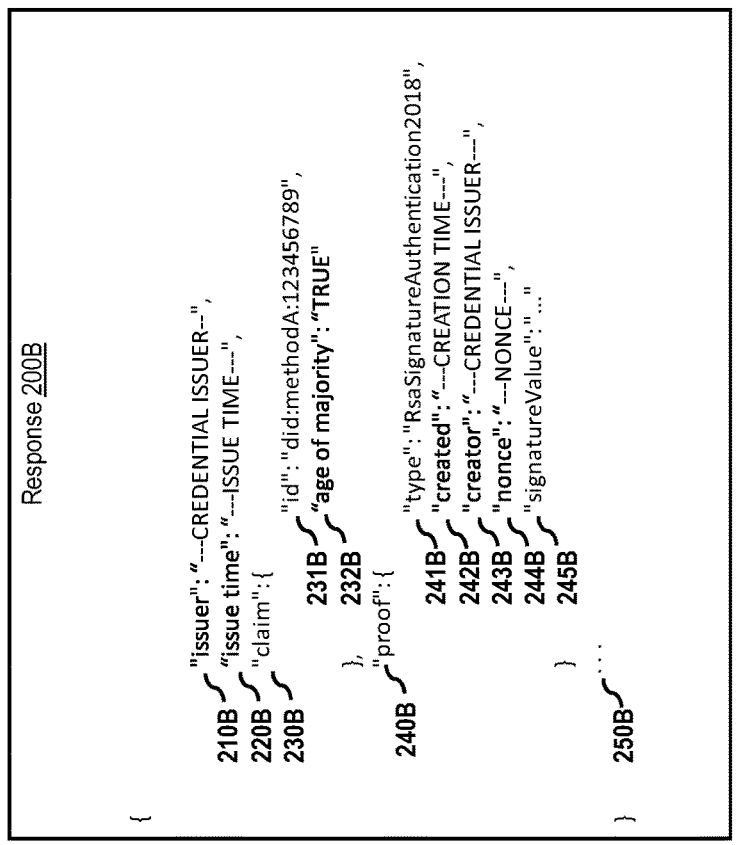
FIG. 2B illustrates an example JWT response token that is generated by a credential issuer.
Figure 2A:
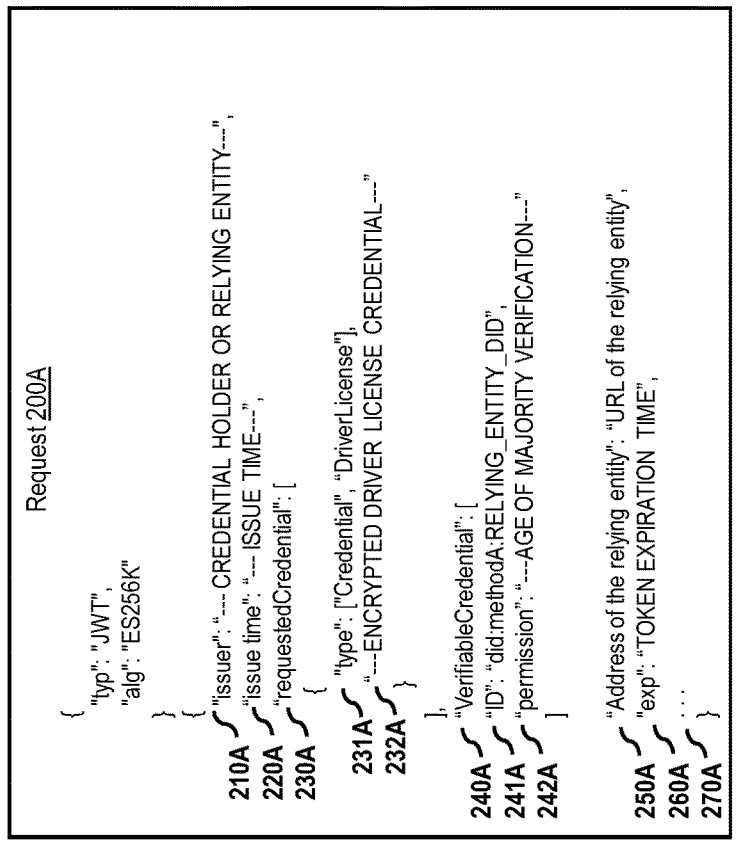
FIG. 2A illustrates an example JWT request token that is generated by a credential holder.

In some embodiments, the request from the credential holder and the response from the credential issuer are wrapped in a JWT token. The JWT token is then sent among various entities. FIG. 2A illustrates an example request token 200A that may be sent from the credential holder to the credential issuer or the relying entity, and FIG. 2B illustrates an example response token 200B that may be sent from the credential issuer to the credential holder or the relying entity. Referring to FIG. 2A, the request token 200A includes data 210A indicating the token issuer and data 220A indicating the token issue time. Here, the token issuer is likely the credential holder or the relying entity. When the credential holder or the relying entity is an owner of a DID, the data 210A may include the DID of the credential issuer.

The request token 200A also includes data 230A indicating the requested credential. The requested credential 230A contains the type of credential 231A and the encrypted credential 232A. For example, the type of the VC may be a driver license, and the encrypted VC may be the encrypted driver license VC of the credential holder (i.e., the token issuer). The request token 200A also includes a second VC 240A that is issued to the relying entity. If the relying entity is a DID owner, the second VC 240A would include the DID of the relying entity 241A. As illustrated in FIG. 2A, the second VC 240A indicates that the relying entity is granted a permission to access whether the credential holder/subject entity has reached the age of majority 242A. The request token 200A also includes an address of the relying entity 250A (e.g., a URL of the relying entity or a DID of the relying entity). The token 200A also includes an expiration time 260A. The ellipsis 270A represents that there may be additional information contained in the request 200A.

When the credential issuer receives the request token 200A, the credential issuer decrypts the encrypted driver license VC by its private key, and verifies whether the subject entity has reached the age of majority. Based on the verification result, the credential issuer then generates a response token 200B illustrated in FIG. 2B. Referring to FIG. 2B, the response token 200B includes data 210B indicating the issuer of the response token (i.e., the credential issuer) and data 220B indicating the token issue time. When the credential issuer is an owner of a DID, data 210B may include the DID of the credential issuer. The response token 200B also includes a claim 230B and a proof 240B. The claim 230B includes data 231B indicating the identifier of the subject entity. When the subject entity is an owner of a DID, data 231B may include the DID of the subject entity. The claim 230B also includes a property-value pair 232B. Here, the property is "age of majority", and value is "TRUE", which indicates that the subject entity has reached the age of majority. The proof 240B includes data 241B indicating the authentication method, 242B indicating the creation time of the claim, data 243B indicating the creator of the claim (e.g., the credential issuer), a nonce 244B, and a signature 245B. The proof 240B allows the relying entity to authenticate the claim 230B is true and correct. Ellipsis 250B represents that there may be additional data contained in the response token 200B.

The request token 200A and response token 200B are merely schematic examples illustrating the possible format of a request from the credential holder and a response from the credential issuer. Additional and/or different tags, syntaxes, and programming languages may be used to achieve the same or similar communication purposes.

Figure 3:
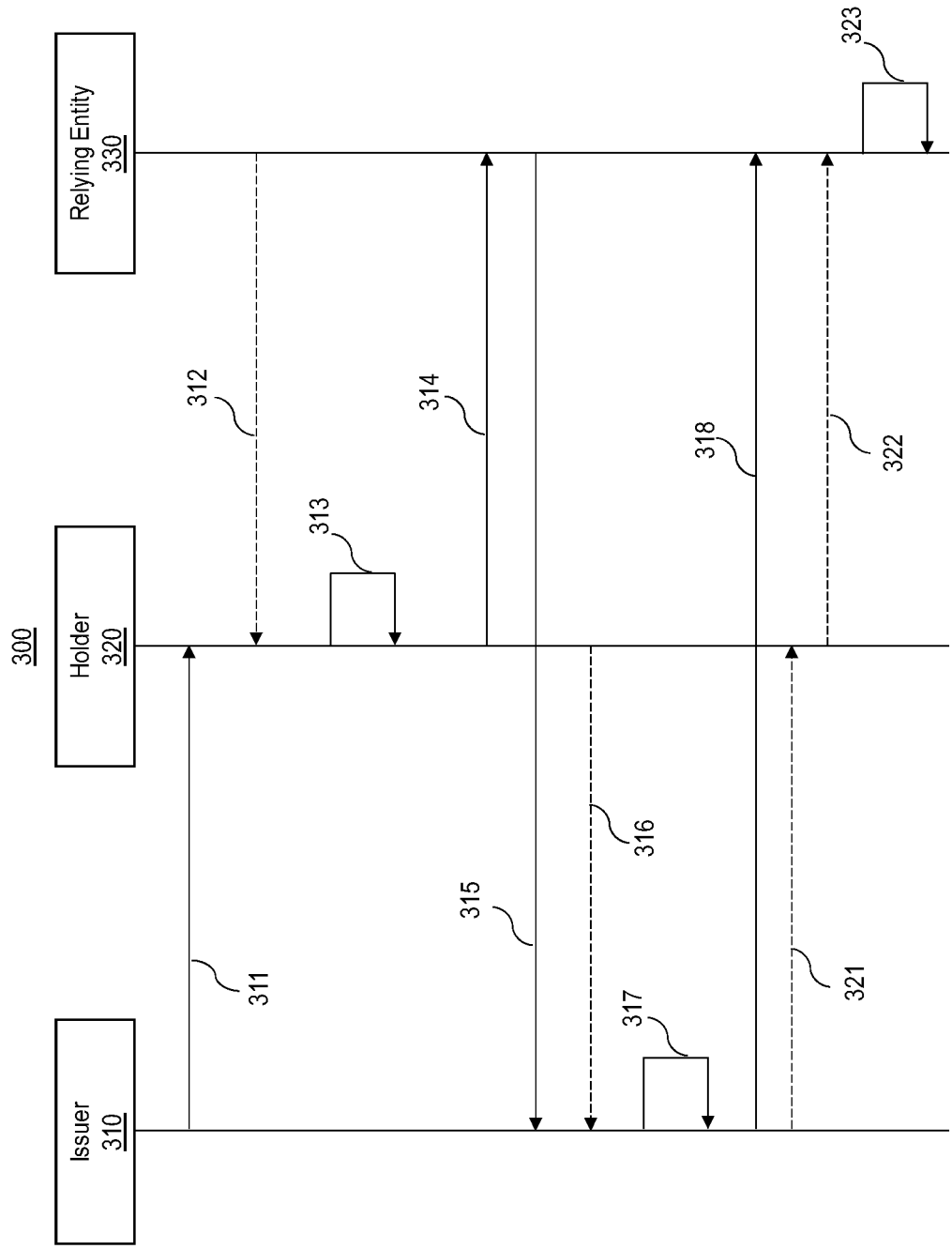
FIG. 3 illustrates an example communication pattern that may occur among computing systems of a credential issuer, a credential holder, and a relying entity.

During the requesting and presenting verifiable data derived from the VC, various communication patterns may be implemented. FIG. 3 illustrates an example communication pattern 300 that may occur among a credential issuer 310, a credential holder 320, and a relying entity 330. Referring to FIG. 3, communication pattern 300 starts from a computing system associated with the credential issuer 310 that issues and sends the credential holder 320 a VC, which is represented by arrow 311. In some cases, the relying entity 330 may request the credential holder 320 for information that is contained in or can be derived from the VC, which is represented by dotted line arrow 312. However, it is not required that the credential holder 320 receives such a request from any relying entity before instructing the credential issuer 310 to perform any transformations on the data contained in the VC.

The credential holder 320 (holding the VC) retrieves a public key of the credential issuer and encrypts at least a portion of the VC by the public key. Additionally, the credential holder 320 also generates one or more instructions at least instructing the credential issuer to extract a subset of data that is contained in the VC or derive a portion of data from the VC, which is represented by arrow 313. If the credential holder 320 has previously received the request from the relying entity 330, the credential holder 320) may generate the one or more instructions based on the relying entity 330's request.

The credential holder 320 then sends the encrypted VC and the instruction(s) to the relying entity 330, which is represented by arrow 314. Alternatively, or in addition, the credential holder 320 sends the encrypted VC and the instruction(s) to the credential issuer 310 directly, which is represented by dotted line arrow 316. Since the VC has been encrypted by the public key of the credential issuer, even if the relying entity 330 receives the encrypted VC, the relying entity 330 cannot access the content contained in the VC. Instead, the relying entity 330 needs to forward the encrypted VC and the instructions to the credential issuer 310, which is represented by arrow 315.

Receiving the encrypted VC and the instructions from the relying entity 330, the credential issuer 310 decrypts the VC, extracts or derives information from the decrypted VC based on the instructions, and generates a response including verifiable data, which is represented by arrow 317. In some embodiments, the response is then sent to the relying entity 330, which is represented by arrow 318. Alternatively, the response is sent to the credential holder 320, and the credential holder 320, in turn, sends at least the verifiable data contained in the response to the relying entity, which is represented by dotted line arrows 321 and 322. The verifiable data includes not only the extracted and/or derived data, but also a proof that prove that the extracted and/or derived data is true and correct. In many cases, the proof includes a signature signed by the credential issuer's private key. The relying entity can decrypt the signature by a public key of the credential issuer to determine the validity of the data that is signed by the signature, which is represented by arrow 323.

Further, as briefly described above, VCs are often recorded in a code format, such as the JSON Web Token (JWT) format, which can be easily understood by computing systems, but not by the general public. The embodiments described herein solve this problem by transforming the code of a traditional verifiable claim into a personal identity card. The personal identity card is a data structure that not only includes the data contained in the VC, but also includes additional metadata (e.g., a logo of the claim issuer, usage data, presentation format, etc.). The personal identity card is then presented to a user as one or more visualizations. At least one of the visualizations resembles a physical identity card. The presentation may be performed by a mobile app, a web browser, and/or a web application. In a decentralized environment, the mobile app may be a part of a user's DID management module (e.g., a wallet app).

Figure 4:
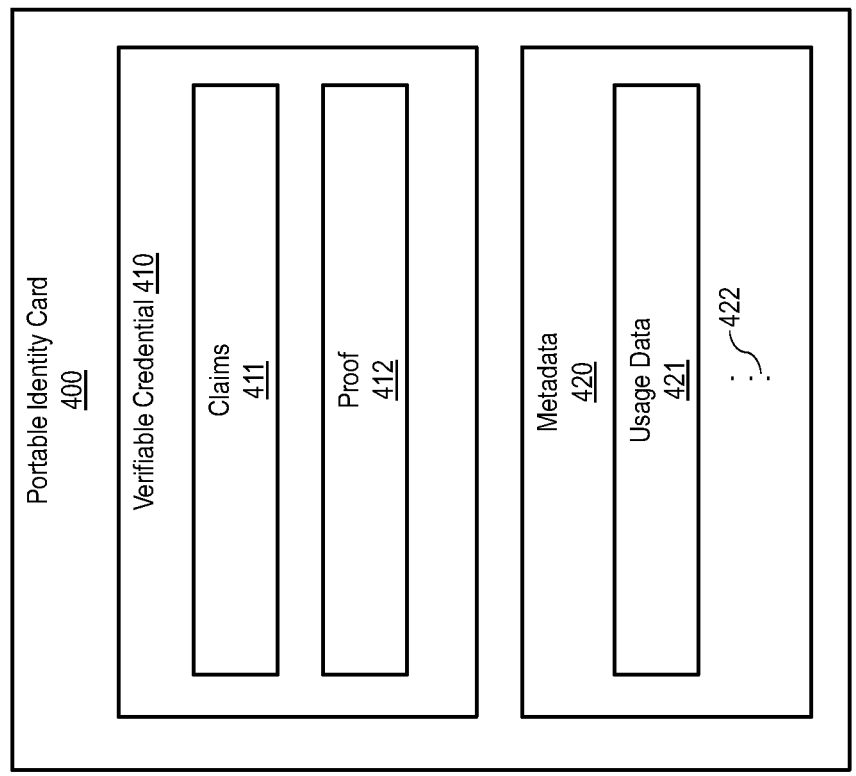
FIG. 4 illustrates an example data structure of a portable identity card.

FIG. 4 illustrates an example data structure 400 of portable identity card. The data structure 400 includes a verifiable credential 410 containing at least one or more claims 411 and proof code 412. The data structure 400 also includes metadata 420. The metadata 420 includes usage data 421. Ellipsis 422 represents that there may be additional metadata contained in the portable identity card 400, including but are not limited to, a logo of the claim issuer, a photo of the subject entity, presentation format, etc.

Figure 5B:
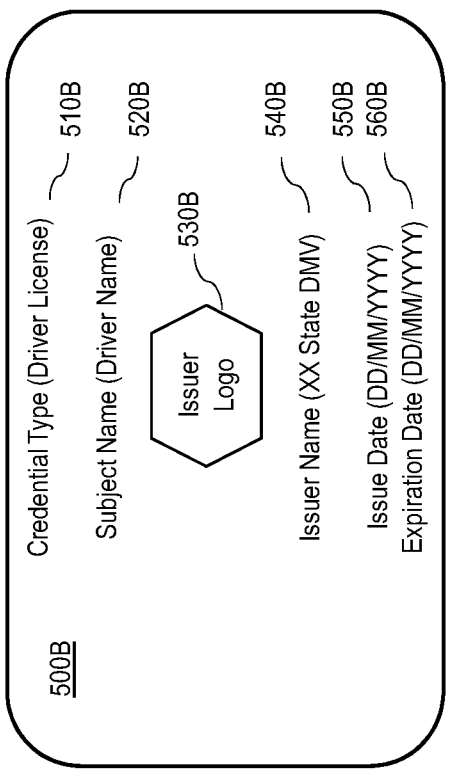
FIG. 5B illustrates an example visualization of a portable identity card that resembles a front side of a physical identity card.
Figure 5C:
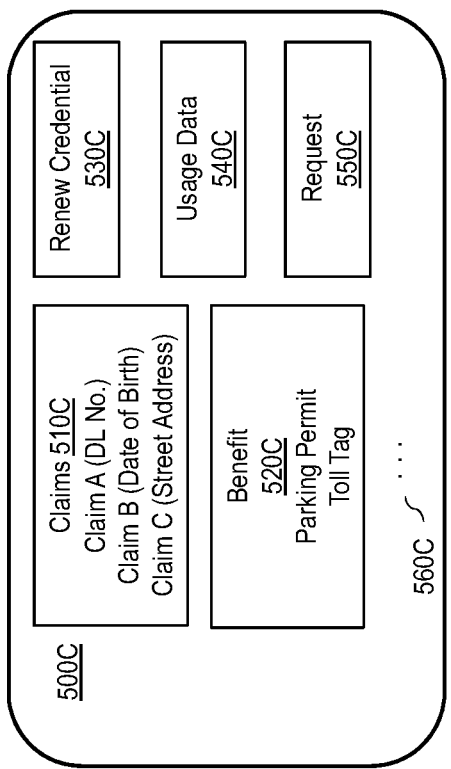
FIG. 5C illustrates an example visualization of a portable identity card that allows users to view additional data and interact with the data contained in the portable identity card.
Figure 5A:
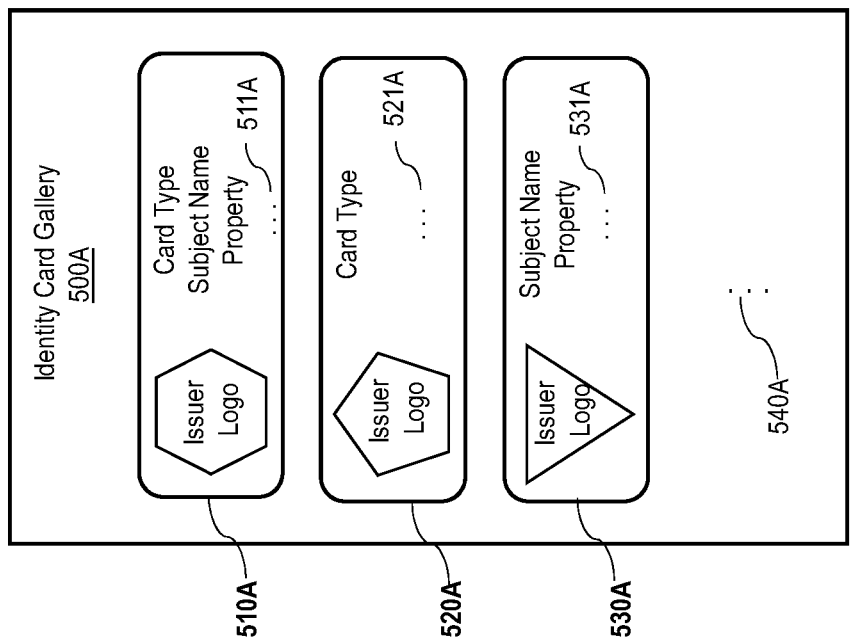
FIG. 5A illustrates an example identity card gallery user interface that includes multiple visualizations of portable identity cards.

FIGS. 5A through 5C illustrate various example visualizations 500A, 500B, and 500C of portable identity card(s) that may be presented to a user. FIG. 5A illustrates an identity card gallery 500A that displays multiple visualizations of portable identity cards 510A, 520A, and 530A. Ellipsis 540A represents that there may be any number of portable identity cards displayed in the identity card gallery 500A. Each of the visualizations of portable identity cards 510A-530A displays the issuer's logo, the card type, the subject name, and/or the claim property. The ellipsis 511A, 521A, and 531A represent that there may be additional or different information presented in each of the visualizations 510A-530A. A user is allowed to select any one of the portable identity cards corresponding to the visualizations 510A-530A. When a particular portable identity card is selected, a larger visualization of a particular portable identity card may be displayed.

FIG. 5B illustrates an example larger visualization 500B of the portable identity card. In some implementations, the visualization 500B resembles a front side of a physical identity card. Alternatively, in some implementations, the visualization 500B may only disclose non-personally identifiable data or metadata associated with the VC, but not the value of each claim. As illustrated in FIG. 5B, the visualization 500B includes credential type 510B, subject name 520B, credential issuer's logo 530B, issuer name 540B, issue date 550B, and expiration date 560B. For example, the credential type 510B may be Driver License: the subject name 520B may be the driver's name, and the issuer name 540B may be a particular state's DMV.

FIG. 5C illustrates another example visualization 500C of the portable identity card. In some implementations, the visualization 500C may resemble a back side of a physical identity card. Alternatively, in some implementations, the visualization 500C includes various user interfaces that allows a user to interact and perform various functions related to the VC. A user is able to switch between the one or more visualizations by interacting with a touch screen or any other input device(s) (e.g., a mouse, keyboard, voice input, etc.).

As illustrated in FIG. 5C, the visualization 500C includes a list of claims 510C, having a claim A that contains the subject entity's driver license number, a claim B that contains the subject entity's date of birth, and claim C that contains the subject entity's street address. The visualization 500C includes a benefit section 520C that indicates the various benefits affiliated to the VC. For example, when the credential holder uses the portable identity card to purchase a parking permit, the parking permit is listed in the benefit section 520C. As another example, when the credential holder uses the portable identity card to purchase a toll tag, the toll tag is listed in the benefit section 520C. The ellipsis 560C represents that there may be additional contents presented in the visualization 500C.

The visualization 500C also includes a renew credential icon 530C. For example, most VCs may have an expiration date. The credential holder may be allowed to click the renew credential icon 530C to trigger the renewal of the VC. In some cases, the credential issuer may charge a fee (e.g., an amount of cryptocurrency) to grant the renewal, and when the user clicks the renew credential icon 530C, additional user interfaces may be presented to the user, such that the required fee or amount of cryptocurrency can be submitted in exchange for the renewal of the VC.

The visualization 500C also includes a usage data section 540C, through which users can review their usage data of the VC in the past. The usage data is the metadata attached to the portable identity card. Each time when the user uses the portable identity card, or VC, the usage data is recorded in the metadata of the portable identity card. For example, if the user has presented the VC at a liquor store, the portable identity card may record the identifier of the liquor store, and the location, and the time that the transaction has occurred. Later, the user can review his/her usage data by clicking the usage data icon 540C.

Further, the visualization 550C may also include a request icon 550C that allows a user to perform various actions related to the VC. For example, when a user touches the icon 550C, a separate user interface may be presented to a user that allows a user to input additional data and request the credential issuer to provide a relying entity a portion of data contained in the VC.

Figure 6:
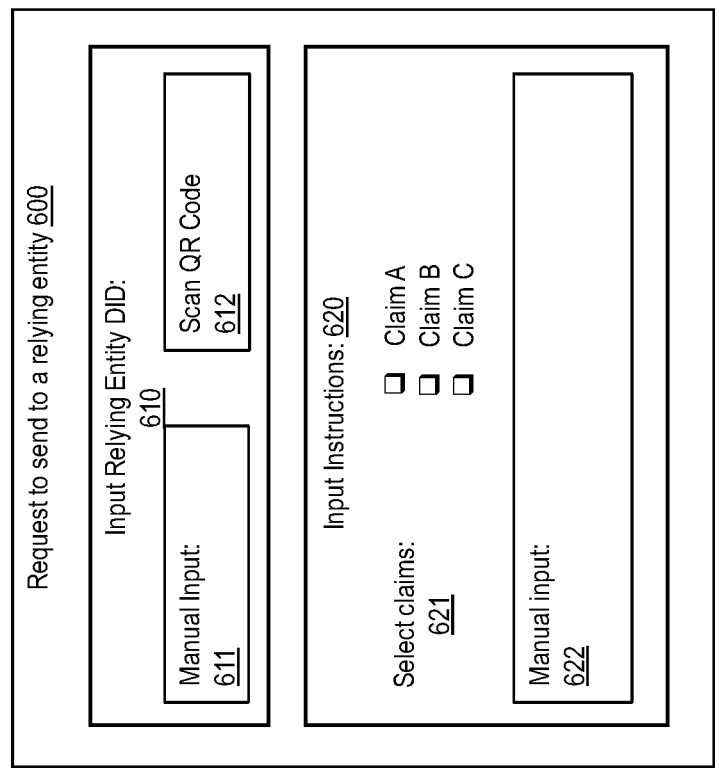
FIG. 6 illustrates an example user interface that allows users to request a credential issuer to extract a subset of data that is contained in the VC or derive a portion of data from a VC.

FIG. 6 illustrates an example user interface 600 that may be presented to a user that allows the user to send requests to the credential issuer. The user interface 600 includes an input field 610 that allows the user to input a relying entity's DID. The user can enter a DID manually 611 or by scanning a QR code 612. The user interface 600 also includes an input field for the user to input one or more instructions 620. The user may select any claims 621 contained in the VC and request the credential issuer to generate a response that only verifies that the one claim is true and correct. The user may also enter instructions manually via the manual input field 622. In response to a user input from the user interface 550C, the computing system of the credential issuer may retrieve the public key of the credential issuer and encrypt the VC using the public key, and generate and send one or more instructions to the credential issuer and/or the relying entity.

In some embodiments, the information contained in the user interface 600 may be automatically filled in response to receiving a request from a relying entity. In some cases, the user may be prompt to review the automatically filled information before the computing system sends the instructions to the credential issuer. In some cases, the computing system may send the instructions to the credential issuer without requiring the user's review.

The user interfaces 500A-500C and 600 shown in FIGS. 5A-5C and 6 are merely examples. Various arrangements may be implemented to achieve the similar functions. For example, some contents shown on the visualization 500B may be presented on the visualization 500C, and vice versa.

Figure 7:
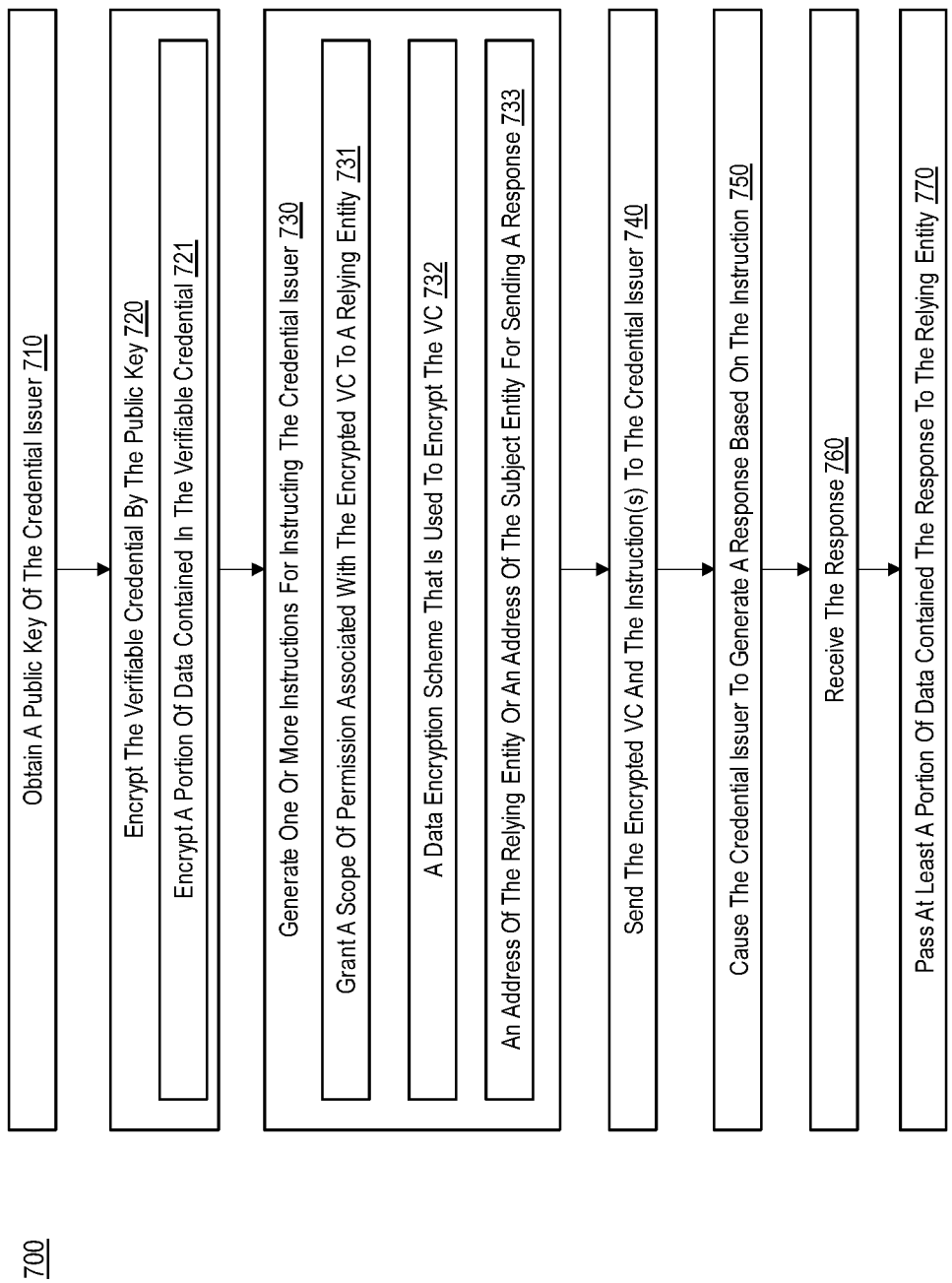
FIG. 7 illustrates a flowchart of an example method for encrypting a VC and requesting a credential issuer to extract a portion of data contained in the VC or derive a portion of data from the VC.
Figure 8:
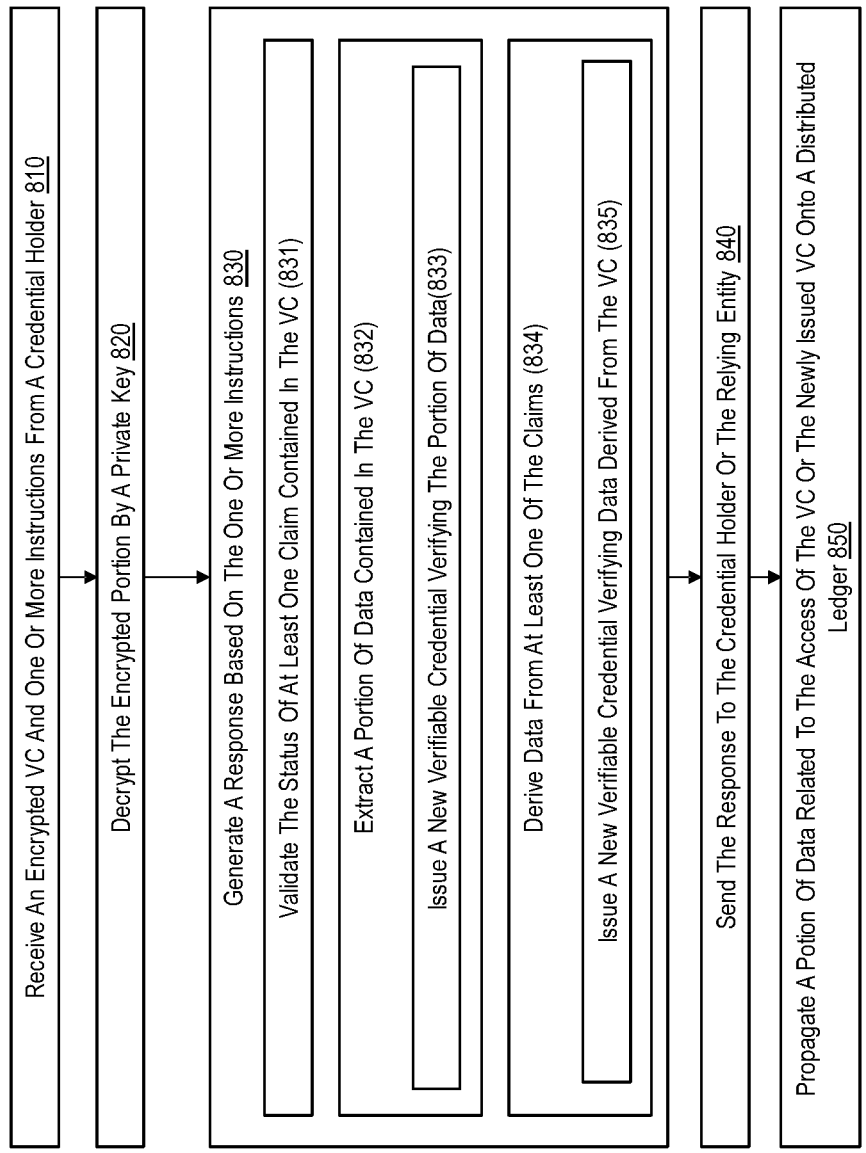
FIG. 8 illustrates a flowchart of an example method for responding to a request from a credential issuer for a subset of data that is contained in a VC or data that can be derived from the VC.
Figure 9:
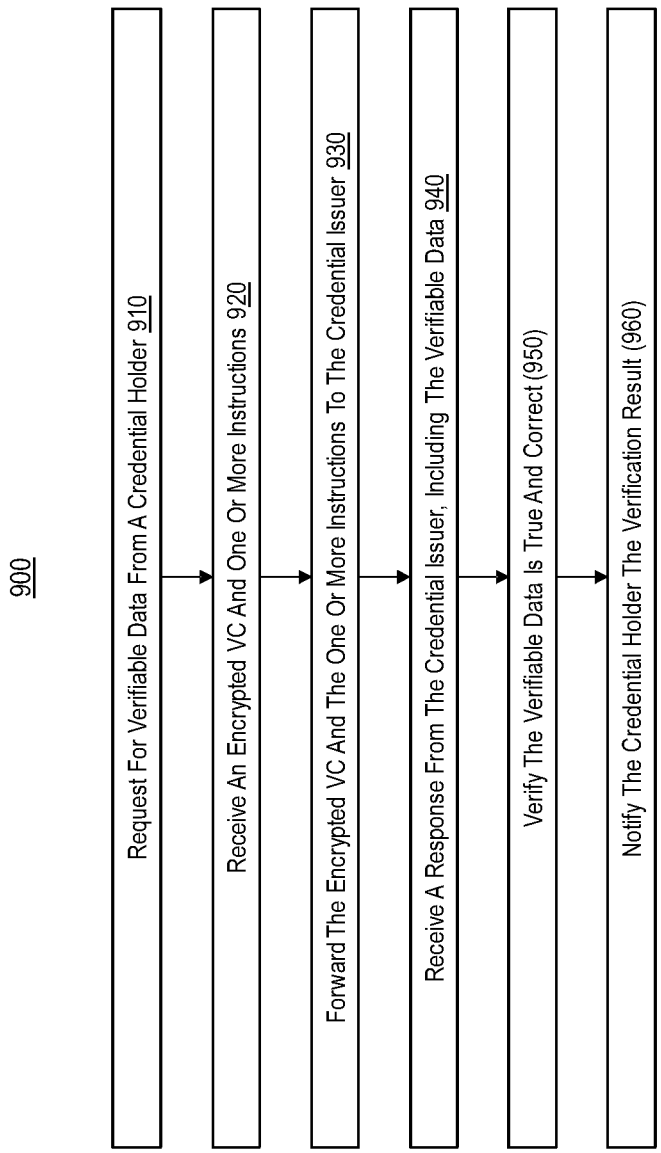
FIG. 9 illustrates a flowchart of an example method for requesting a credential holder for data that is contained in a VC or can be derived from the VC.

The following discussion with respect to FIGS. 7-9 now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 7 illustrates a flowchart of an example method 700 for encrypting a VC (also called a first VC) and requesting the credential issuer to extract a portion of data contained in the VC or derive a portion of data from the VC, which is likely implemented at a computing system associated with a credential holder. The credential holder may store the VC at a mobile device, a personal PC, and/or a cloud storage. In a decentralized environment, the credential holder is likely an owner of a DID, and the VC may be stored at a management module (e.g., a wallet app), an ID hub, and/or a user agent.

The method 700 includes obtaining a public key of the credential issuer (710). In some cases, the public key is included in the VC. In some cases, the public key may be retrieved from a distributed ledger. In yet some other cases, the public key may be obtained from an authentication service. The computing system then encrypts the VC by the public key (720). In some embodiments, the whole VC is encrypted and additional metadata is attached to the encrypted VC. In some other embodiments, only a portion of VC is encrypted (721). For example, only claims contained in the VC may be encrypted, and the proof and other metadata are not encrypted. In such a case, the not encrypted data may be attached onto the encrypted data as metadata.

The computing system also generates one or more instructions for instructing the credential issuer (730). At least one of the instruction(s) grants a scope of permission associated with the VC to a relying entity (731). The scope of permission includes permission to access a subset of data that is contained in the VC or a portion of data that can be derived from the VC. In some embodiments, the at least one of the instruction(s) is wrapped in a second VC that is issued to the relying entity on behalf of the subject entity.

In some cases, one of the instruction(s) indicates a data encryption scheme that is used to encrypt the VC, such that the credential holder can decrypt the encrypted VC based on the data encryption scheme (732). In some cases, one of the instruction(s) indicates an address of the relying entity or an address of the subject entity, such that the credential issuer can send a response to the address(es) (733). Some of the instructions are attached to the encrypted first VC or the second VC as metadata. Alternatively or in addition, some of the instructions are attached to the request sent to the relying entity or the credential issuer.

The computing system sends the encrypted VC and the instruction(s) to the credential issuer (740) and causes the credential issuer to generate a response based on the instruction (750). The response may be sent to the relying entity or to the computing system. When the response is sent to the computing system (760), the computing system then passes on at least a portion of the data contained in the response to the relying entity (770).

FIG. 8 illustrates a flowchart of an example method 800 for receiving a request including an encrypted VC and one or more instructions and generating a response based on the request, which is likely performed by a computing system associated with a credential issuer. The computing system first receives an encrypted VC and one or more instructions from a credential holder (810). The VC is encrypted by a public key of the credential issuer, and the computing system decrypts the encrypted VC by a private key corresponding to the public key (820). The decrypted VC includes one or more claims that were previously issued by the credential issuer.

The computing system then generates a response based on the one or more instructions (830). In some cases, the one or more instructions may instruct the computing system to validate the status of at least one claim contained in the VC. In such a case, the computing system validates the status of the at least one claim and generates a response indicating the validity of the at least one claim 831).

In some cases, the instruction(s) instruct the computing system to extract a portion of data contained in the VC. In such a case, the computing system, in turn, extracts the portion of data contained in the decrypted VC (832). In some cases, the instruction(s) instruct the computing system to derive a portion of data from the VC. The computing system, in turn, derives the portion of data from the VC (834). In either these cases, the instruction(s) may also instruct the computing system to issue a new VC, containing the extracted and/or derived portion of data. The computing system, in turn, generates a new VC, including the extracted and/or derived data and a proof that proves the extracted and/or derived data is true and correct (833, 835). In some embodiments, the proof is a cryptographic signature that is signed by a private key of the computing system or the credential issuer. For example, the cryptographic signature can be generated by generating a hash H from the claim(s) contained in the VC using a one-way hash function, and then encrypting the hash H by the private key of the computing system or the credential issuer. When the relying entity receives the VC containing the cryptographic signature, the relying entity decrypts the cryptographic signature using a public key of the credential issuer to recover H'. At the same time, the relying entity also uses the same hash function to recreate the hash H from the claim(s) contained in the VC, the recreated H is then compared with the H'. If the recreated H is the same as the H', the signature is deemed as authentic or valid. Otherwise, the claim contained in the VC has been altered, or the signature was not generated by the credential issuer.

The extracted and/or derived data and/or new VC(s) (including the proof) are wrapped in the response. The response is then sent to the credential holder or the relying entity (840). In a decentralized environment, at least one of the credential holder, the subject entity, the credential issuer, and/or the relying entity is an owner of DID. In such a case, the computing system may also propagate a portion of data related to the access of the VC or data related to the newly issued VC onto a distributed ledger (850).

FIG. 9 illustrates a flowchart of method 900 for requesting for data contained or can be derived from a VC, which is likely implemented in a computing system associated with a relying entity. The computing system first requests for verifiable data from a credential holder (910). For example, the computing system may be associated with a liquor store, and want to verify that a customer has reached the age of majority. The customer is a driver license VC holder, and the customer's mobile device receives the request from the computing system and generates an encrypted VC and one or more instructions. The encrypted VC is encrypted by a public key of the DMV, and the one or more instructions instructing the DMV to generate a response to prove that the customer has reached the age of majority. The customer's mobile device sends the encrypted VC and the instructions to the computing system of the liquor store. Receiving the encrypted VC and the one or more instructions (920), the computing system, in turn, forwards the encrypted VC and the one or more instructions to the credential issuer (930). The term "forwarding" does not necessarily mean that the original received message from the credential holder is literally forwarded to the credential issuer. Instead, in some cases, the computing system may perform some transformations to the data, and repackage it in a JWT request token, and send the JWT request token to the credential issuer (930). The JWT request token corresponds to the JWT request token 200A of FIG. 2A.

Receiving the encrypted VC and the one or more instructions, the credential issuer sends a response, including the requested verifiable data, to the credential holder or the relying entity. When the response is sent to the relying entity, the computing system receives the response (940). The computing system then verifies that the received verifiable data is true and correct (950). The verifiable data is likely to include a cryptographic signature signed by a private key of the credential issuer, and the computing system may decrypt the cryptographic signature by a public key of the credential issuer, and compare the decrypted data with the verifiable data to determine whether the verifiable data is truly generated by the credential issuer, and whether the data has been tempered. In some cases, the computing system may notify the credential issuer the verification result (960). For example, when the liquor store receives the data related to a customer and verifies that the customer has reached the age of majority, the computing system associated with the liquor store may notify the mobile device of the customer, and complete the purchase transaction for the customer. Receiving the notification, the customer's device may display a visualization of the portable identity card, and record the completed transaction as the usage metadata with the portable identity card.

As previously mentioned, the principles described herein may be performed in a decentralized context. As an example, the computing system associated with a credential holder can be a digital wallet, such as the DID management module 1120 described below with respect to FIG. 11. Alternatively, or in addition, the subject of the claims, and the issuer identifier, can be decentralized identifiers (DIDs). Alternatively, or in addition, the portable identity card data structure (or portions thereof) may be stored in a DID document. This would be especially helpful as the portable identity card would then be accessible by the holder from any device associated with the holder's DID. Accordingly, decentralized identifiers will now be described with respect to FIGS. 10 and 11.

Figure 10:
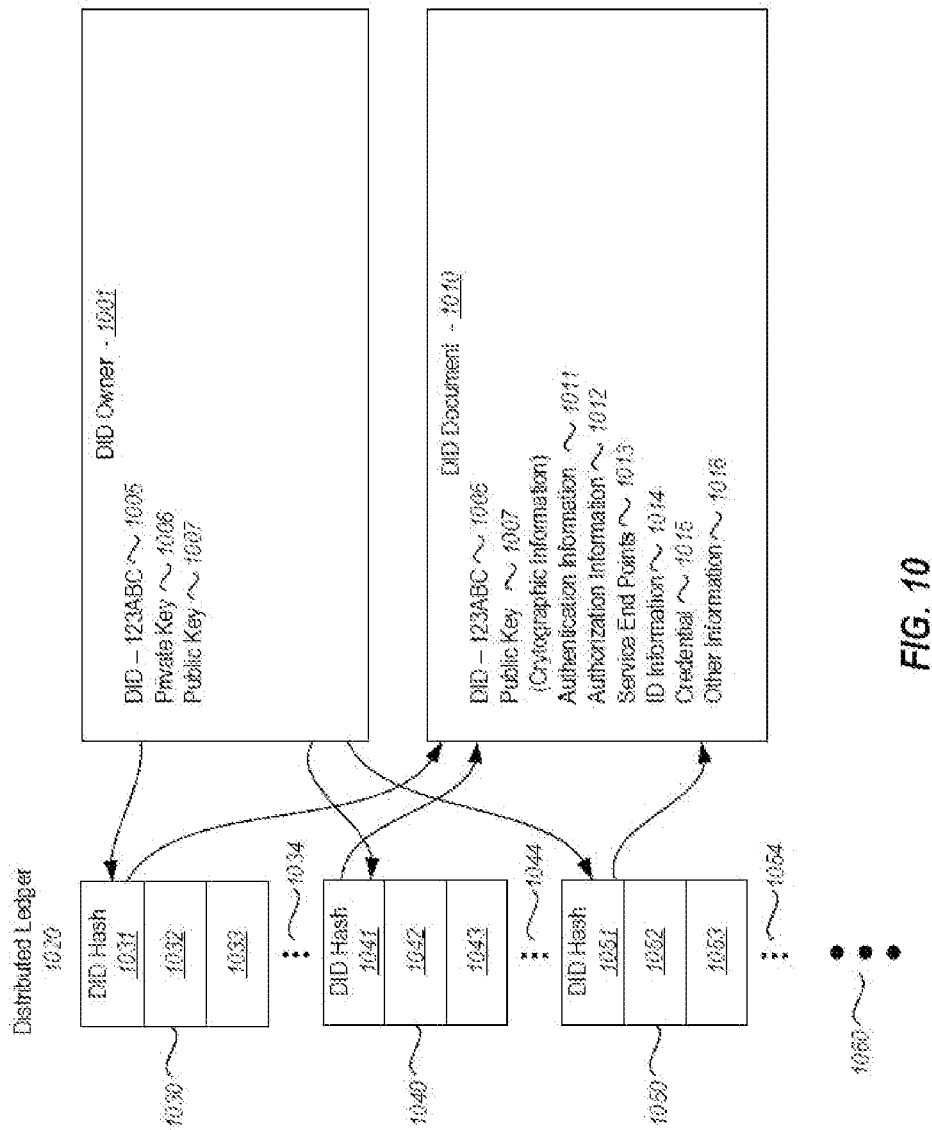
FIG. 10 illustrates an example environment for creating a decentralized identification (DID)

As illustrated in FIG. 10, a DID owner 1001 may own or control a DID 1005 that represents a digital identity of the DID owner 1001. The DID 1005 is a digital identity that correlates with (i.e., identifies) the DID owner 1001 across different digital contexts. The DID owner 1001 may register a DID using a creation and registration service, which will be explained in more detail below.

The DID owner 1001 may be any entity that could benefit from a digital identity. For example, the DID owner 1001 may be a human being or an organization of human beings. Such organizations might include a company, department, government, agency, or any other organization or group of organizations. Each individual human being might have a DID while the organization(s) to which each belongs might likewise have a DID.

The DID owner 1001 may alternatively be a machine, system, or device, or a collection of machine(s), device(s) and/or system(s). In still other embodiments, the DID owner 1001 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 1206 described above with respect to FIG. 12. An example of a complex executable component 1206 might be an artificial intelligence. Accordingly, an artificial intelligence may also own a DID.

Thus, the DID owner 1001 may be any entity, human or non-human, that is capable of creating the DID 1005 or at least having the DID 1005 created for and/or associated with them. Although the DID owner 1001 is shown as having a single DID 1005, this need not be the case as there may be any number of DIDs associated with the DID owner 1001 as circumstances warrant.

As mentioned, the DID owner 1001 may create and register the DID 1005. The DID 1005 may be any identifier that may be associated with the DID owner 1001. Preferably, that identifier is unique to that DID owner 1001, at least within a scope in which the DID is anticipated to be in use. As an example, the identifier may be a locally unique identifier, and perhaps more desirably a globally unique identifier for identity systems anticipated to operate globally. In some embodiments, the DID 1005 may be a Uniform Resource identifier (URI) (such as a Uniform Resource Locator (URL)) or other pointer that relates the DID owner 1001 to mechanisms to engage in trustable interactions with the DID owner 1001.

The DID 1005 is "decentralized" because it does not require a centralized, third party management system for generation, management, or use. Accordingly, the DID 1005 remains under the control of the DID owner 1001. This is different from conventional centralized IDs which base trust on centralized authorities and that remain under control of corporate directory services, certificate authorities, domain name registries, or other centralized authority (referred to collectively as "centralized authorities" herein). Accordingly, the DID 1005 may be any identifier that is under the control of the DID owner 1001 and that is independent of any centralized authority. In some embodiments, the structure of the DID 1005 may be as simple as a
user name or some other human-understandable term. However, in other embodiments, for increased security, the DID 1005 may preferably be a random string of numbers and letters. In one embodiment, the DID 1005 may be a string of 128 numbers and letters. Accordingly, the embodiments disclosed herein are not dependent on any specific implementation of the DID 1005. In a very simple example, the DID 1005 is shown within the figures as "123ABC".

As also shown in FIG. 10, the DID owner 1001 has control of a private key 1006 and public key 1007 pair that is associated with the DID 1005. Because the DID 1005 is independent of any centralized authority, the private key 1006 should at all times be fully in control of the DID owner 1001. That is, the private and public keys should be generated in a decentralized manner that ensures that they remain under the control of the DID owner 1001.

As will be described in more detail to follow, the private key 1006 and public key 1007 pair may be generated on a device controlled by the DID owner 1001. The private key 1006 and public key 1007 pair should not be generated on a server controlled by any centralized authority as this may cause the private key 1006 and public key 1007 pair to not be fully under the control of the DID owner 1001 at all times. Although FIG. 10 and this description have described a private and public key pair, it will also be noted that other types of reasonable cryptographic information and/or mechanisms may also be used as circumstances warrant.

FIG. 10 also illustrates a DID document 1010 that is associated with the DID 1005. As will be explained in more detail to follow, the DID document 1010 may be generated at the time that the DID 1005 is created. In its simplest form, the DID document 1010 describes how to use the DID 1005. Accordingly, the DID document 1010 includes a reference to the DID 1005, which is the DID that is described by the DID document 1010. In some embodiments, the DID document 1010 may be implemented according to methods specified by a distributed ledger 1020 (such as blockchain) that will be used to store a representation of the DID 1005 as will be explained in more detail to follow. Thus, the DID document 1010 may have different methods depending on the specific distributed ledger.

The DID document 1010 also includes the public key 1007 created by the DID owner 1001 or some other equivalent cryptographic information. The public key 1007 may be used by third party entities that are given permission by the DID owner 1001 to access information and data owned by the DID owner 1001. The public key 1007 may also be used to verify that the DID owner 1001 in fact owns or controls the DID 1005.

The DID document 1010 may also include authentication information 1011. The authentication information 1011 specifies one or more mechanisms by which the DID owner 1001 is able to prove that the DID owner 1001 owns the DID 1005. In other words, the mechanisms of the authentication information 1011 shows proof of a binding between the DID 1005 (and thus its DID owner 1001) and the DID document 1010. In one embodiment, the authentication information 1011 specifies that the public key 1007 be used in a signature operation to prove the ownership of the DID 1005. Alternatively, or in addition, the authentication information 1011 specifies that the public key 1007 be used in a biometric operation to prove ownership of the DID 1005. Accordingly, the authentication information 1011 includes any number of mechanisms by which the DID owner 1001 is able to prove that the DID owner 1001 owns the DID 1005.

The DID document 1010 may also include authorization information 1012. The authorization information 1012 allows the DID owner 1001 to authorize third party entities the rights to modify the DID document 1010 or some part of the document without giving the third party the right to prove ownership of the DID 1005. In one example, the authorization information 1012 allows the third party to update any designated set of one or more fields in the DID document 1010 using any designated update mechanism. Alternatively, the authorization information allows the third party to limit the usages of DID 1005 by the DID owner 1001 for a specified time period. This may be useful when the DID owner 1001 is a minor child and the third party is a parent or guardian of the child. The authorization information 1012 may allow the parent or guardian to limit use of the DID owner 1001 until such time as the child is no longer a minor.

The authorization information 1012 also specifies one or more mechanisms that the third party will need to follow to prove they are authorized to modify the DID document 1010. In some embodiments, these mechanisms may be similar to those discussed previously with respect to the authentication information 1011.

The DID document 1010 also includes one or more service endpoints 1013. A service endpoint includes a network address at which a service operates on behalf of the DID owner 1001. Examples of specific services include discovery services, social networks, file storage services such as identity servers or hubs, and verifiable claim repository services. Accordingly, the service endpoints 1013 operate as pointers for the services that operate on behalf of the DID owner 1001. These pointers may be used by the DID owner 1001 or by third party entities to access the services that operate on behalf of the DID owner 1001. Specific examples of service endpoints 1013 will be explained in more detail to follow.

The DID document 1010 further includes identification information 1014. The identification information 1014 includes personally identifiable information such as the name, address, occupation, family members, age, hobbies, interests, or the like of DID owner 1001. Accordingly, the identification information 1014 listed in the DID document 1010 represents a different persona of the DID owner 1001 for different purposes.

A persona may be pseudo anonymous. As an example, the DID owner 1001 may include a pen name in the DID document when identifying him or her as a writer posting articles on a blog. A persona may be fully anonymous. As an example, the DID owner 1001 may only want to disclose his or her job title or other background data (e.g., a school teacher, an FBI agent, an adult older than 21 years old, etc.) but not his or her name in the DID document. As yet another example, a persona may be specific to who the DID owner 1001 is as an individual. As an example, the DID owner 1001 may include information identifying him or her as a volunteer for a particular charity organization, an employee of a particular corporation, an award winner of a particular award, and so forth.

The DID document 1010 also includes credential information 1015, which may also be referred to herein as an attestation. The credential information 1015 may be any information that is associated with the DID owner 1001's background. For instance, the credential information 1015 may be (but is not limited to) a qualification, an achievement, a government ID, a government right such as a passport or a driver's license, a payment provider or bank account, a university degree or other educational history, employment status and history, or any other information about the DID owner 1001's background.

The DID document 1010 also includes various other information 1016. In some embodiments, the other information 1016 may include metadata specifying when the DID document 1010 was created and/or when it was last modified. In other embodiments, the other information 1016 may include cryptographic proofs of the integrity of the DID document 1010. In still further embodiments, the other information 1016 may include additional information that is either specified by the specific method implementing the DID document or desired by the DID owner 1001.

FIG. 10) also illustrates a distributed ledger 1020. The distributed ledger 1020 can be any decentralized, distributed network that includes various computing systems that are in communication with each other. In one example, the distributed ledger 1020 includes a first distributed computing system 1030, a second distributed computing system 1040, a third distributed computing system 1050, and any number of additional distributed computing systems as represented by the ellipses 1060. The distributed ledger 1020 operates according to any known standards or methods for distributed ledgers. Examples of conventional distributed ledgers that correspond to the distributed ledger 1020 include, but are not limited to, Bitcoin [BTC], Ethereum, and Litecoin.

In the context of DID 1005, the distributed ledger or blockchain 1020 is used to store a representation of the DID 1005 that points to the DID document 1010. In some embodiments, the DID document 1010 may be stored on the actual distributed ledger. Alternatively, in other embodiments the DID document 1010 may be stored in a data storage (not illustrated) that is associated with the distributed ledger 1020.

A representation of the DID 1005 is stored on each distributed computing system of the distributed ledger 1020. For example, in FIG. 10 this is shown as DID hash 1031, DID hash 1041, and DID hash 1051, which are ideally identical hashed copies of the same DID. The DID hash 1031, DID hash 1041, and DID hash 1051 point to the location of the DID document 1010. The distributed ledger or blockchain 1020 may also store numerous other representations of other DIDs as illustrated by references 1032, 1033, 1034, 1042, 1043, 1044, 1052, 1053, and 1054.

In one embodiment, when the DID owner 1001 creates the DID 1005 and the associated DID document 1010, the DID hash 1031, DID hash 1041, and DID hash 1051 are written to the distributed ledger 1020. The distributed ledger 1020 thus records that the DID 1005 now exists. Since the distributed ledger 1020 is decentralized, the DID 1005 is not under the control of any entity outside of the DID owner 1001. DID hash 1031, DID hash 1041, and DID hash 1051 may each include, in addition to the pointer to the DID document 1010, a record or time stamp that specifies when the DID 1005 was created. At a later date, when modifications are made to the DID document 1010, each modification (and potentially also a timestamp of the modification) is also be recorded in DID hash 1031, DID hash 1041, and DID hash 1051. DID hash 1031, DID hash 1041, and DID hash 1051 could further include a copy of the public key 1007 so that the DID 1005 is cryptographically bound to the DID document 1010.

Figure 11:
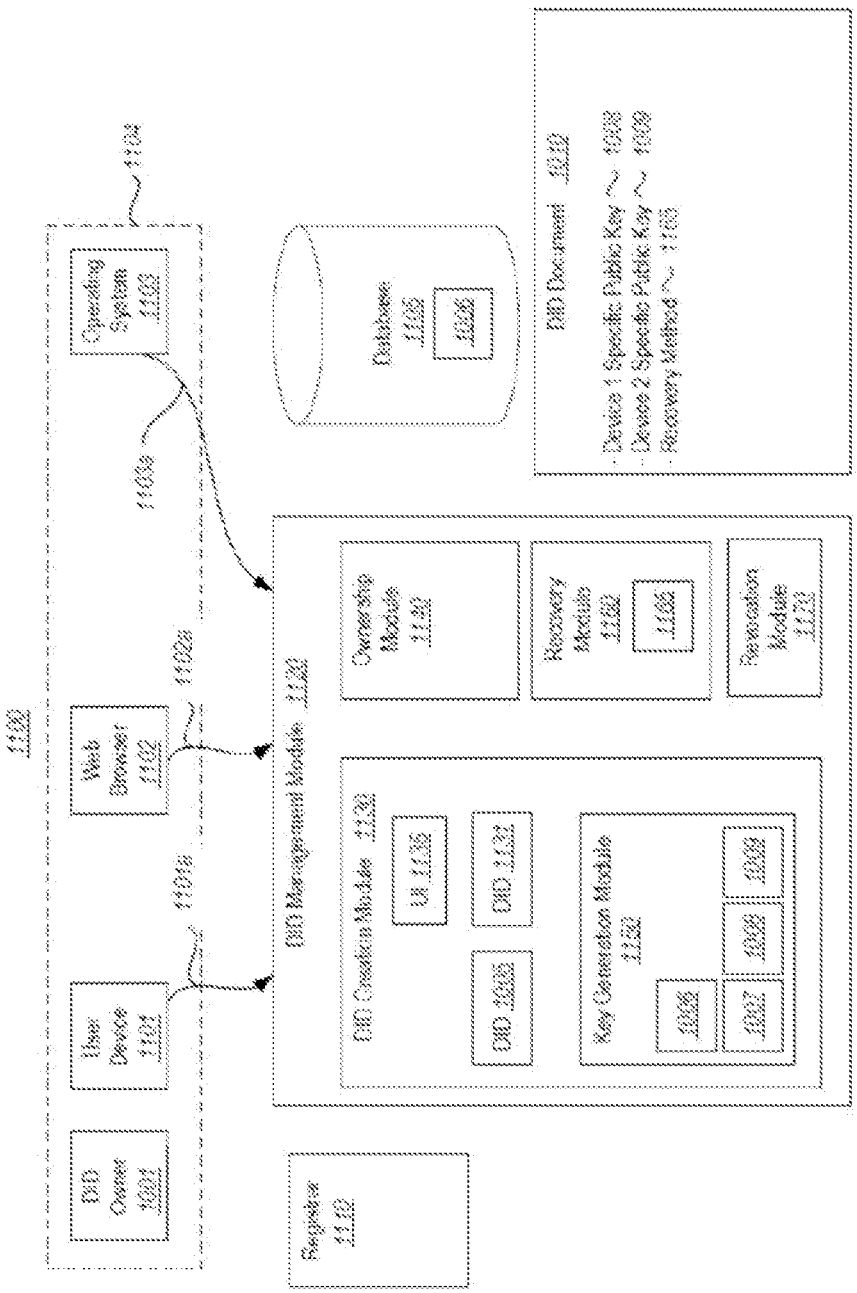
FIG. 11 illustrates an example environment for various DID management operations and services.

Having described DIDs and how they operate generally with reference to FIG. 10, specific embodiments of DID environments will now be explained with respect to FIG. 11. FIG. 11 illustrates an example environment 1100 that may be used to perform various DID management operations and services will now be explained. It will be appreciated that the environment of FIG. 11 may reference elements from FIG. 10 as needed for ease of explanation.

As shown in FIG. 11, the environment 1100 includes various devices and computing systems that are owned or otherwise under the control of the DID owner 1001. These may include a user device 1101. The user device 1101 may be, but is not limited to, a mobile device such as a smart phone, a computing device such as a laptop computer, or any device such as a car or an appliance that includes computing abilities. The device 1101 includes a web browser 1102 operating on the device and an operating system 1103 operating the device. More broadly speaking, the dashed line 1104 represents that all of these devices may be owned by or may otherwise be under the control of the DID owner 1001.

The environment 1100 also includes a DID management module 1120. In operation, as represented by respective arrows 1101*a*, 1102*a* and 1103*a*, the DID management module 1120 resides on and is executed by one or more of user device 1101, web browser 1102, and the operating system 1103. Accordingly, the DID management module 1120 is shown as being separate for ease of explanation. The DID management module 1120 may be also described as a "wallet" in that it can hold various claims made by or about a particular DID. In one example, the DID management module 1120 is structured as described above for the executable component 1206.

As shown in FIG. 11, the DID management module 1120 includes a DID creation module 1130. The DID creation module 1130 may be used by the DID owner 1001 to create the DID 1005 or any number of additional DIDs, such as DID 1131. In one embodiment, the DID creation module may include or otherwise have access to a User Interface (UI) element 1135 that may guide the DID owner 1001 in creating the DID 1005. The DID creation module 1130 has one or more drivers that are configured to work with specific distributed ledgers such as distributed ledger 1020 so that the DID 1005 complies with the underlying methods of that distributed ledger.

A specific embodiment will now be described. For example, the UI 1135 may provide a prompt for the user to enter a user name or some other human recognizable name. This name may be used as a display name for the DID 1005 that will be generated. As previously described, the DID 1005 may be a long string of random numbers and letters and so having a human-recognizable name for a display name may be advantageous. The DID creation module 1130 may then generate the DID 1005. In the embodiments having the UI 1135, the DID 1005 may be shown in a listing of identities and may be associated with the human-recognizable name.

The DID creation module 1130 may also include a key generation module 1150. The key generation module may generate the private key 1006 and public key 1007 pair previously described. The DID creation module 1130 may then use the DID 1005 and the private and public key pair to generate the DID document 1010.

In operation, the DID creation module 1130 accesses a registrar 1110 that is configured to the specific distributed ledger that will be recording the transactions related to the DID 1005. The DID creation module 1130 uses the registrar 1110 to record DID hash 1031, DID hash 1041, and DID hash 1051 in the distributed ledger in the manner previously described, and to store the DID document 1010 in the manner previously described. This process may use the public key 1007 in the hash generation.

In some embodiments, the DID management module 1120 may include an ownership module 1140. The ownership module 1140 may provide mechanisms that ensure that the DID owner 1001 is in sole control of the DID 1005. In this way, the provider of the DID management module 1120 is able to ensure that the provider does not control the DID 1005, but is only providing the management services.

The key generation module 1150 generates the private key 1006 and public key 1007 pair and the public key 1007 is then recorded in the DID document 1010. Accordingly, the public key 1007 may be used by all devices associated with the DID owner 1001 and all third parties that desire to provide services to the DID owner 1001. Accordingly, when the DID owner 1001 desires to associate a new device with the DID 1005, the DID owner 1001 may execute the DID creation module 1130 on the new device. The DID creation module 1130 may then use the registrar 1110 to update the DID document 1010 to reflect that the new device is now associated with the DID 1005, which update would be reflected in a transaction on the distributed ledger 1020.

In some embodiments, however, it may be advantageous to have a public key per device 1101 owned by the DID owner 1001 as this may allow the DID owner 1001 to sign with the device-specific public key without having to access a general public key. In other words, since the DID owner 1001 will use different devices at different times (for example using a mobile phone in one instance and then using a laptop computer in another instance), it is advantageous to have a key associated with each device to provide efficiencies in signing using the keys. Accordingly, in such embodiments, the key generation module 1150 generates additional public keys 1008 and 1009 when the additional devices execute the DID creation module 1130. These additional public keys may be associated with the private key 1006 or in some instances may be paired with a new private key.

In those embodiments where the additional public keys 1008 and 1009 are associated with different devices, the additional public keys 1008 and 1009 are recorded in the DID document 1010 as being associated with those devices, as shown in FIG. 11. The DID document 1010 may include the information (information 1005, 1007 and 1011 through 1016) previously described in relation to FIG. 10 in addition to the information (information 1008, 1009 and 1165) shown in FIG. 11. If the DID document 1010 existed prior to the device-specific public keys being generated, then the DID document 1010 would be updated by the creation module 1130 via the registrar 1110 and this would be reflected in an updated transaction on the distributed ledger 1020.

In some embodiments, the DID owner 1001 may desire to keep secret the association of a device with a public key or the association of a device with the DID 1005. Accordingly, the DID creation module 1130 may cause that such data be secretly shown in the DID document 1010.

As described thus far, the DID 1005 has been associated with all the devices under the control of the DID owner 1001, even when the devices have their own public keys. However, in some embodiments, each device or some subset of devices under the control of the DID owner 1001 may each have their own DID. Thus, in some embodiments the DID creation module 1130 may generate an additional DID, for example DID 1131, for each device. The DID creation module 1130 would then generate private and public key pairs and DID documents for each of the devices and have them recorded on the distributed ledger 1020 in the manner previously described. Such embodiments may be advantageous for devices that may change ownership as it may be possible to associate the device-specific DID to the new owner of the device by granting the new owner authorization rights in the DID document and revoking such rights from the old owner.

As mentioned, to ensure that the private key 1006 is totally in the control of the DID owner 1001, the private key 1006 is created on the user device 1101, browser 1102, or operating system 1103 that is owned or controlled by the DID owner 1001 that executed the DID management module 1120. In this way, there is little chance that a third party (and most consequentially, the provider of the DID management module 1120) will gain control of the private key 1006.

However, there is a chance that the device storing the private key 1006 may be lost by the DID owner 1001, which may cause the DID owner 1001 to lose access to the DID 1005. Accordingly, in some embodiments, the UI 1135 includes the option to allow the DID owner 1001 to export the private key 1006 to an off device secured database 1105 that is under the control of the DID owner 1001. As an example, the database 1105 may be one of the identity hubs 1210 described below with respect to FIG. 12. A storage module 1180 is configured to store data (such as the private key 1006 or attestations made by or about the DID owner 1001) off device in the database 1105 or identity hubs 1210. In some embodiments, the private key 1006 is stored as a QR code that is scanned by the DID owner 1001.

In other embodiments, the DID management module 1120 may include a recovery module 1160 that may be used to recover a lost private key 1006. In operation, the recovery module 1160 allows the DID owner 1001 to select one or more recovery mechanisms 1165 at the time the DID 1005 is created that may later be used to recover the lost private key. In those embodiments having the UI 1135, the UI 1135 may allow the DID owner 1001 to provide information that will be used by the one or more recovery mechanisms 1165 during recovery. The recovery module 1160 may then be run on any device associated with the DID 1005.

The DID management module 1120 may also include a revocation module 1170 that is used to revoke or sever a device from the DID 1005. In operation, the revocation module uses the UI element 1135, which allows the DID owner 1001 to indicate a desire to remove a device from being associated with the DID 1005. In one embodiment, the revocation module 1170 accesses the DID document 1010 and causes that all references to the device be removed from the DID document 1010. Alternatively, the public key for the device may be removed, and this change is then reflected in the DID document 1010 may then be reflected as an updated transaction on the distributed ledger 1020.

Because the principles described herein are performed in the context of a computing system, some introductory discussion of a computing system will be described with respect to FIG. 12. Then, this description will return to the principles of a decentralized identifier (DID) platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 12:
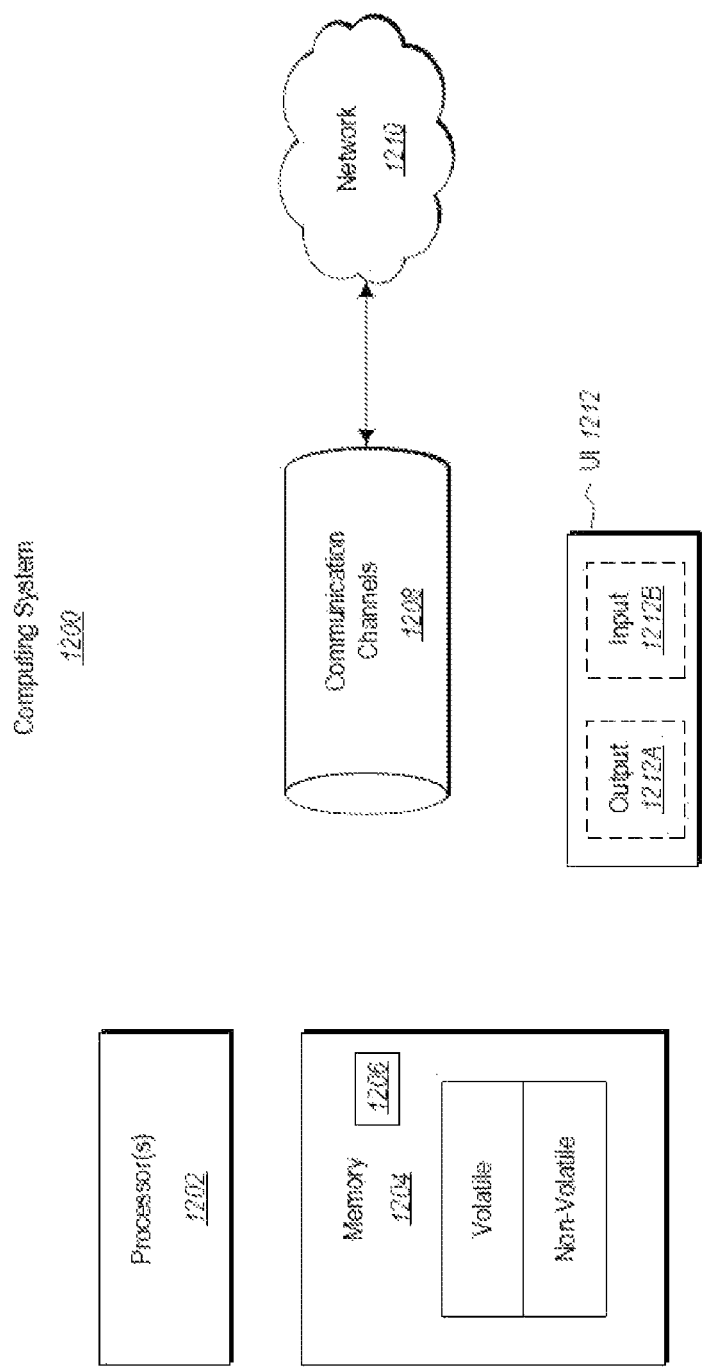
FIG. 12 illustrates an example computing system in which the principles described herein may be employed.

As illustrated in FIG. 12, in its most basic configuration, a computing system 1200 includes at least one hardware processing unit 1202 and memory 1204. The processing unit 1202 includes a general-purpose processor. Although not required, the processing unit 1202 may also include a field programmable gate array (FPGA), an application specific integrated circuit (ASIC), or any other specialized circuit. In one embodiment, the memory 1204 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 1200 also has thereon multiple structures often referred to as an "executable component". For instance, the memory 1204 of the computing system 1200 is illustrated as including executable component 1206. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 1204 of the computing system 1200. Computing system 1200 may also contain communication channels 1208 that allow the computing system 1200 to communicate with other computing systems over, for example, network 1210.

While not all computing systems require a user interface, in some embodiments, the computing system 1200 includes a user interface system 1212 for use in interfacing with a user. The user interface system 1212 may include output mechanisms 1212A as well as input mechanisms 1212B. The principles described herein are not limited to the precise output mechanisms 1212A or input mechanisms 1212B as such will depend on the nature of the device. However, output mechanisms 1212A might include, for instance, speakers, displays, tactile output, virtual or augmented reality, holograms and so forth. Examples of input mechanisms 1212B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation)

before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system associated with a credential holder comprising:
    one or more processors; and
    one or more computer-readable media having thereon computer-executable instructions that are structured such that, when executed by the one or more processors, cause the computing system to perform the following:
        receive a verifiable credential (VC) from a credential issuer, the VC containing one or more claims about a subject entity;
        obtain a public key of the credential issuer;
        encrypt the VC by the public key of the credential issuer;
        generate one or more instruction(s), at least one of the instructions instructing the credential issuer to grant a scope of permission associated with the encrypted VC to a relying entity, the scope of permission comprising at least permission to access a subset of data that can be extracted from the VC or a portion of data that can be derived from the VC;
        send the encrypted VC and the instruction(s) to the credential issuer or the relying entity;
        such that if the encrypted VC and the instruction(s) have been sent to the relying entity, the relying entity forwards the encrypted VC and the instruction(s) to the credential issuer;
        cause the credential issuer to generate a response containing the subset of verifiable data or the portion of data and proof code, the proof code being configured to prove validity of the subset of data or the portion of data; and
        cause the credential issuer to send the response to the computing system associated with the credential holder or to the relying entity.

2. The computing system of claim 1, wherein:
    the VC is a first VC, and
    the computing system is further caused to issue a second VC, on behalf of the subject entity, to the relying entity, in which at least one claim of the second VC is associated with the at least one instruction(s) that grants the relying entity the scope of permission associated with the encrypted VC.

3. The computing system of claim 2, wherein at least one of the instructions is attached to the encrypted first VC or the second VC as metadata.

4. The computing system of claim 1, wherein the one or more instructions includes at least one of the following: (1) a data encryption scheme that is used to encrypt the VC, (2) an address or an identifier of an entity that is to receive the response.

5. The computing system of claim 4, the computing system further caused to propagate a portion of data related to the VC or the DID onto a distributed ledger.

6. The computing system of claim 1, wherein:
    at least one of the subject entity, the credential holder, the relying entity, or the credential issuer is an owner of a decentralized identifier (DID).

7. The computing system of claim 1, wherein the response includes a new VC that contains the extracted subset of data or the derived portion of data in the original VC.

8. The computing system of claim 1, the computing system further caused to:
    receive the response from the credential issuer; and
    forward at least the subset of data or the portion of data and proof code to the relying entity.

9. The computing system of claim 1, wherein:
    the computing system is further caused to receive a request from the relying entity; and
    the one or more instructions are generated based on the request by the relying entity.

10. The computing system of claim 1, wherein:
    the computing system is further caused to receive a user input; and
    the one or more instructions are generated based on the user input.

11. The computing system of claim 1, the computing system further caused to:
- create a data structure of a portable identity card;
- insert the VC in the data structure of the portable identity card; and
- present the data structure of the personal identity card as one or more visualizations, at least one of the visualization(s) resembling a physical identity card.

12. The computing system of claim 11, wherein:
- at least one of the one or more visualizations is configured to receive a user input instructing the credential issuer to extract a subset of data that is contained in the VC or derive a portion of data from the VC; and
- in response to the user input, the computing system is caused to generate the one or more instructions.

13. The computing system of claim 11, the computing system further caused to:
- record communications among the computing system, the credential issuer, or the relying entity as metadata of the portable identity card.

14. The computing system of claim 11, wherein at least one of the visualization(s) displays at least one of the following: (1) a credential type, (2) a subject name, (3) a issuer logo, (4) an issuer name, (5) an issue date, (6) an expiration date, (7) a user interface configured to receive a user input, (8) data related to the one or more claim(s), (9) benefit of the VC, (10) one or more relying entities, (11) usage data.

15. A method implemented at a computing system for requesting a credential issuer for a subset of verifiable data that is contained in a verifiable credential (VC) or verifiable data that can be derived from the VC, comprising,
- receiving a first verifiable credential (VC) from a credential issuer, the VC containing one or more claims about a subject entity;
- obtaining a public key of the credential issuer;
- encrypting the first VC by the public key of the credential issuer;
- generating one or more instruction(s), at least one of the instructions instructing the credential issuer to extract a subset of data that is contained in the first VC or derive a portion of data from the first VC;
- issuing a second VC, on behalf of the subject entity, to the relying entity, in which at least one claim of the second VC is associated with at least one of the one or more instruction(s), such that the second VC grants the relying entity a scope of permission to access the subset of data that is to be extracted from the VC or the portion of data that is to be derived from the VC,
- sending the encrypted first VC and the second VC to the credential issuer or a relying entity such that if the encrypted VC and the instruction(s) are sent to the relying entity, the relying entity is triggered to forward the encrypted VC and the instruction(s) to the credential issuer;
- causing the credential issuer to generate a response containing the subset of verifiable data or the portion of data and proof code, the proof code being configured to prove validity of the subset of data or the portion of data; and
- causing the credential issuer to send the response to the computing system associated with the credential holder or to the relying entity.

16. The method of claim 15, wherein:
- the VC is a first VC, and
- the computing system is further caused to issue a second VC, on behalf of the subject entity, to the relying entity, in which at least one claim of the second VC is associated with the at least one instruction(s) that grants the relying entity the scope of permission associated with the encrypted VC.

17. The method of claim 16, wherein at least one of the instructions is attached to the encrypted first VC or the second VC as metadata.

18. The method of claim 15, wherein the one or more instructions includes at least one of the following: (1) a data encryption scheme that is used to encrypt the VC, (2) an address or an identifier of an entity that is to receive the response.

19. The method of claim 15, wherein:
- at least one of the subject entity, the credential holder, the relying entity, or the credential issuer is an owner of a decentralized identifier (DID).

20. A computer program product comprising one or more computer-readable hardware storage devices having thereon computer-executable instructions that are executable by one or more processors of a computing system for configuring the computing system to request a credential issuer for a subset of verifiable data that is contained in a verifiable credential (VC) or verifiable data that can be derived from the VC by at least configuring the computing system to perform the following:
- receive a verifiable credential (VC) from a credential issuer, the VC containing one or more claims about a subject entity;
- obtain a public key of the credential issuer;
- encrypt the VC by the public key of the credential issuer;
- generate one or more instruction(s), at least one of the instructions instructing the credential issuer to grant a scope of permission associated with the encrypted VC to a relying entity, the scope of permission comprising at least permission to access a subset of data that can be extracted from the VC or a portion of data that can be derived from the VC;
- send the encrypted VC and the instruction(s) to the credential issuer or the relying entity;
- such that if the encrypted VC and the instruction(s) have been sent to the relying entity, the relying entity forwards the encrypted VC and the instruction(s) to the credential issuer;
- cause the credential issuer to generate a response containing the subset of verifiable data or the portion of data and proof code, the proof code being configured to prove validity of the subset of data or the portion of data; and
- cause the credential issuer to send the response to the computing system associated with the credential holder or to the relying entity.

\* \* \* \* \*